US008972217B2

(12) United States Patent
VanGilder et al.

(10) Patent No.: US 8,972,217 B2
(45) Date of Patent: Mar. 3, 2015

(54) SYSTEM AND METHOD FOR PREDICTING TEMPERATURE VALUES IN A DATA CENTER

(75) Inventors: James W. VanGilder, Pepperell, MA (US); Xuanhang Zhang, Tewksbury, MA (US); Christopher M. Healey, Chelmsford, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 441 days.

(21) Appl. No.: 12/795,862

(22) Filed: Jun. 8, 2010

(65) Prior Publication Data

US 2011/0301911 A1    Dec. 8, 2011

(51) Int. Cl.
| G01K 17/10 | (2006.01) |
| G06F 17/50 | (2006.01) |
| G06F 1/20 | (2006.01) |
| G01K 1/02 | (2006.01) |

(52) U.S. Cl.
CPC ........ *G06F 17/5009* (2013.01); *G06F 17/5004* (2013.01); *G06F 1/20* (2013.01); *Y02B 60/1275* (2013.01); *G01K 1/026* (2013.01); *G06F 2217/80* (2013.01)
USPC .............................. 702/136; 702/99; 702/130

(58) Field of Classification Search
USPC ........................ 702/60, 61, 99, 130, 136, 186
See application file for complete search history.

(56) References Cited

U.S. PATENT DOCUMENTS

| 4,823,290 A | 4/1989 | Fasack et al. |
| 5,095,712 A | 3/1992 | Narreau |
| 5,216,623 A | 6/1993 | Barrett et al. |
| 5,367,670 A | 11/1994 | Ward et al. |
| 5,410,448 A | 4/1995 | Barker, III et al. |
| 5,581,478 A | 12/1996 | Cruse et al. |
| 5,718,628 A | 2/1998 | Nakazato et al. |
| 5,735,134 A | 4/1998 | Liu et al. |
| 6,055,480 A | 4/2000 | Nevo et al. |

(Continued)

FOREIGN PATENT DOCUMENTS

| CN | 1485906 A | 3/2004 |
| WO | 2008144375 A2 | 11/2008 |
| WO | 2009/014893 A1 | 1/2009 |

OTHER PUBLICATIONS

"Case Study, Application of TileFlow to Improve Cooling in a Data Center," Innovative Research, Inc., 2004.

(Continued)

*Primary Examiner* — Sujoy Kundu
*Assistant Examiner* — Paul D Lee
(74) *Attorney, Agent, or Firm* — Lando & Anastasi, LLP

(57) ABSTRACT

A system and method for evaluating equipment in a data center, the equipment including a plurality of equipment racks, and at least one cooling provider. In one aspect, a method includes receiving data regarding each of the plurality of equipment racks and the at least one cooling provider, the data including a layout of the equipment racks and the at least one cooling provider, and a power draw value for each of the equipment racks, storing the received data, determining air flow between the at least one cooling provider and each of the equipment racks, determining inlet and exit air temperature for the at least one cooling provider based on the layout, the power draw and the airflow, and for each equipment rack, determining inlet and exit air temperature based on the layout, the power draw and the airflow.

18 Claims, 15 Drawing Sheets

(56) References Cited

U.S. PATENT DOCUMENTS

| | | | |
|---|---|---|---|
| 6,134,511 A | 10/2000 | Subbarao | |
| 6,216,956 B1 | 4/2001 | Ehlers et al. | |
| 6,246,969 B1 | 6/2001 | Sinclair et al. | |
| 6,494,050 B2 | 12/2002 | Spinazzola et al. | |
| 6,574,104 B2 | 6/2003 | Patel et al. | |
| 6,672,955 B2 | 1/2004 | Charron | |
| 6,694,759 B1 | 2/2004 | Bash et al. | |
| 6,718,277 B2 | 4/2004 | Sharma | |
| 6,745,579 B2 | 6/2004 | Spinazzola et al. | |
| 6,827,142 B2 | 12/2004 | Winkler et al. | |
| 7,020,586 B2 | 3/2006 | Snevely | |
| 7,031,870 B2 | 4/2006 | Sharma et al. | |
| 7,051,946 B2 | 5/2006 | Bash et al. | |
| 7,085,133 B2 | 8/2006 | Hall | |
| 7,148,796 B2 | 12/2006 | Joy et al. | |
| 7,251,547 B2 | 7/2007 | Bash et al. | |
| 7,313,503 B2 | 12/2007 | Nakagawa et al. | |
| 7,315,448 B1 | 1/2008 | Bash et al. | |
| 7,365,973 B2 | 4/2008 | Rasmussen et al. | |
| 7,366,632 B2 | 4/2008 | Hamann et al. | |
| 7,378,165 B2 | 5/2008 | Brignone et al. | |
| 7,403,391 B2 | 7/2008 | Germagian et al. | |
| 7,426,453 B2 | 9/2008 | Patel et al. | |
| 7,472,043 B1 | 12/2008 | Low et al. | |
| 7,558,649 B1 | 7/2009 | Sharma et al. | |
| 7,568,360 B1 | 8/2009 | Bash et al. | |
| 7,596,476 B2 | 9/2009 | Rasmussen et al. | |
| 7,620,480 B2 | 11/2009 | Patel et al. | |
| 7,676,280 B1 | 3/2010 | Bash et al. | |
| 7,726,144 B2 | 6/2010 | Larson et al. | |
| 7,799,474 B2 | 9/2010 | Lyon et al. | |
| 7,832,925 B2 | 11/2010 | Archibald et al. | |
| 7,844,440 B2 | 11/2010 | Nasle et al. | |
| 7,881,910 B2 | 2/2011 | Rasmussen et al. | |
| 7,885,795 B2 | 2/2011 | Rasmussen et al. | |
| 7,908,126 B2 | 3/2011 | Bahel et al. | |
| 7,979,250 B2 | 7/2011 | Archibald et al. | |
| 8,155,922 B2 | 4/2012 | Loucks | |
| 8,219,362 B2 | 7/2012 | Shrivastava et al. | |
| 8,244,502 B2 | 8/2012 | Hamann et al. | |
| 8,249,825 B2 | 8/2012 | VanGilder et al. | |
| 8,473,265 B2 | 6/2013 | Hlasny et al. | |
| 8,509,959 B2 | 8/2013 | Zhang et al. | |
| 2001/0042616 A1 | 11/2001 | Baer | |
| 2002/0043969 A1 | 4/2002 | Duncan et al. | |
| 2002/0071031 A1 | 6/2002 | Lord et al. | |
| 2002/0149911 A1 | 10/2002 | Bishop et al. | |
| 2003/0115000 A1 | 6/2003 | Bodas | |
| 2003/0115024 A1 | 6/2003 | Snevely | |
| 2003/0158718 A1 | 8/2003 | Nakagawa et al. | |
| 2004/0020224 A1 | 2/2004 | Bash et al. | |
| 2004/0065097 A1 | 4/2004 | Bash et al. | |
| 2004/0065104 A1 | 4/2004 | Bash et al. | |
| 2004/0075984 A1 | 4/2004 | Bash et al. | |
| 2004/0089009 A1 | 5/2004 | Bash et al. | |
| 2004/0089011 A1 | 5/2004 | Patel et al. | |
| 2004/0189161 A1 | 9/2004 | Davis et al. | |
| 2004/0240514 A1 | 12/2004 | Bash et al. | |
| 2004/0262409 A1 | 12/2004 | Crippen et al. | |
| 2005/0023363 A1 | 2/2005 | Sharma et al. | |
| 2005/0267639 A1 | 12/2005 | Sharma et al. | |
| 2006/0080001 A1 | 4/2006 | Bash et al. | |
| 2006/0096306 A1 | 5/2006 | Okaza et al. | |
| 2006/0115586 A1 | 6/2006 | Xing et al. | |
| 2006/0214014 A1 | 9/2006 | Bash et al. | |
| 2007/0078635 A1* | 4/2007 | Rasmussen et al. | 703/1 |
| 2007/0121295 A1 | 5/2007 | Campbell et al. | |
| 2007/0171613 A1 | 7/2007 | McMahan et al. | |
| 2007/0174024 A1 | 7/2007 | Rasmussen et al. | |
| 2007/0190919 A1 | 8/2007 | Donovan et al. | |
| 2007/0274035 A1 | 11/2007 | Fink et al. | |
| 2008/0041076 A1 | 2/2008 | Tutunoglu et al. | |
| 2008/0104985 A1 | 5/2008 | Carlsen | |
| 2008/0105412 A1 | 5/2008 | Carlsen et al. | |
| 2008/0174954 A1 | 7/2008 | VanGilder et al. | |
| 2008/0180908 A1 | 7/2008 | Wexler | |
| 2009/0030554 A1 | 1/2009 | Bean, Jr. et al. | |
| 2009/0138313 A1 | 5/2009 | Morgan et al. | |
| 2009/0138888 A1 | 5/2009 | Shah et al. | |
| 2009/0150123 A1 | 6/2009 | Archibald et al. | |
| 2009/0223234 A1 | 9/2009 | Campbell et al. | |
| 2009/0259343 A1 | 10/2009 | Rasmussen et al. | |
| 2009/0309570 A1 | 12/2009 | Lehmann et al. | |
| 2009/0326879 A1* | 12/2009 | Hamann et al. | 703/2 |
| 2010/0106464 A1 | 4/2010 | Hlasny et al. | |
| 2010/0256959 A1 | 10/2010 | VanGilder et al. | |
| 2010/0286956 A1 | 11/2010 | VanGilder et al. | |
| 2010/0287018 A1 | 11/2010 | Shrivastava et al. | |
| 2011/0040529 A1 | 2/2011 | Hamann et al. | |
| 2012/0071992 A1 | 3/2012 | VanGilder et al. | |
| 2012/0158387 A1 | 6/2012 | VanGilder et al. | |
| 2012/0170205 A1 | 7/2012 | Healey et al. | |
| 2013/0006426 A1 | 1/2013 | Healey et al. | |

OTHER PUBLICATIONS

"Management Strategy for Network Critical Physical Infrastructure", White Paper #100, pp. 110, American Power Conversion, Dec. 15, 2003, published on World Wide Web.

Abi-Zadeh, Davar et al., "A Transient Analysis of Environmental Conditions for a Mission Critical Facility after a Failure of Power", Arup Mission Criticial Facilities, Feb. 2001, pp. 1-12.

Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.

Anderson, Donald, "Iterative Procedures for Nonlinear Integral Equations," Journal of the Association for Computing Machinery, vol. 12, No. 4, Oct. 1965, pp. 547-560.

APC User's Guide Brochure, "InfraStruXure Manager," Mar. 2004, 181 pgs.

Ashrae, "Thermal Guidelines for Data Processing Environments" 2004, Atlanta: American Society of Heating, Refrigerating, and Air-Conditioning Engineers, Inc., 2004, Atlanta.

Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.

Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s1 0619-005-0413-0.

Chandrakant D. Patel, et al., "Thermal Considerations in Cooling Large Scale High Copute Density Data Centers" IEEE 2002, pp. 767-776.

Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.

Ehsan Pakabaznia et al., "Miminizing data center cooling and server power costs", Proceedings of the 14th ACM/IEEE International Symposium on Low Power Electronics and Design, ISLPED '09, Jan. 1, 2009, p. 145, XP55015368, New York, New York, USA, DOI: 10.1145/1594233.1594268, ISBN: 978-1-60-558684-7.

Herrlin, M.K., "Rack Cooling Effectiveness in Data Centers and Telecom Central Offices: The Rack Cooling Index (RCI)," ASHRAE Transaction, 2005, pp. 725-731, vol. 111(2).

Innovative Research, Inc., http://web.archive.org/web/20051221005029/http://www.inres.com/, Dec. 21, 2005, published on World Wide Web.

International Search Report for PCT/US2006/16739 mailed Oct. 3, 2006.

International Search Report for PCT/US2008/051908 mailed Jul. 3, 2008.

Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007, pp. 193-225, XP019499845, ISSN: 1573-7578, DOI:10. 1007/S10619-006-7007-3.

(56) References Cited

OTHER PUBLICATIONS

Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008, pp. 1129-1142, ISSN: 0018-9340, DOI: 10.1109/TC.2008.52.
K. Dunlap, "Cooling Audit for Identifying Potential Cooling Problems in Data Centers", White Paper #40, pp. 1-18, American Power Conversion, May 20, 2004, published on World Wide Web.
Karki et al., "Techniques for controlling airflow distribution in raised-floor data centers," ASME 2003.
Marwah, M.; Sharma, R.; Shih, R.; Patel, C.; Bhatia, V.; Mekanapurath, M.; Velumani, R.; Velayudhan, S., 2009, Data analysis, visualization and knowledge discovery in sustainable data centers, in Proceedings of the 2nd Bangalore Annual Compute Conference (COMPUTE '09).
N. Rasmussen, "Calculating Total Cooling Requirements for Data Centers", White Paper #25, pp. 1-8, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
N. Rasmussen, "Strategies for Deploying Blade Servers in Existing Data Centers", White Paper #125, pp. 1-14, American Power Conversion, Mar. 29, 2005, published on World Wide Web.
Pakbaznia, E.; Ghasemazar, M.; Pedram, M.:, "Temperature-aware dynamic resource provisioning in a power-optimized datacenter," Design, Automation & Test in Europe Conference & Exhibition (DATE), 2010, vol., No., pp. 124-129, Mar. 8-12, 2010.
Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000, pp. 90-98, ISBN: 978-0-7803-5912-3.
Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.
Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.
Shrivastava S.K. et al., "A flow-network model for predicting rack cooling in containment systems", Proceedings of the ASME Interpack Conference—2009: Presented at 2009 ASME Interpack Conference, July 19-23, 2009, San Francisco, California, USA, vol. 2, Jul. 19, 2009, pp. 785-791.
Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009, pp. 41-50, DOI: 10.1115/IMECE2009-10806, ISBN: 978-0-7918-4386-4.
Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010, pp. 1-8, XP031702357.
Vangilder et al., "Airflow Uniformity thourhg Perforated Tiles in a Raised-Floor Data Center", White Paper 121, Jul. 17-22, 2005, 10 pages.
Vangilder, James W. et al., "Caputure index: an airflow-based rack cooling performance metric," 2007, ASHRAE Transactions, vol. 113, pp. 126-136.
Vangilder, James W. et al., "Real-Time prediction of rack-cooling performance," 2006, ASHRAE Transactions, vol. 112, pp. 151-162.
Vangilder, James, W., et al., "Capture index: an airflow-based rack cooling performance metric," 2007, ASHRAE Transactions, vol. 113, pp. 126-136.
Vangilder, James, W., et al., "Real-time prediction of rack-cooling performance," 2006, ASHRAE Transactions, vol. 112, pp. 151-162.

* cited by examiner

SYSTEM AND METHOD FOR PREDICTING TEMPERATURE VALUES IN A DATA CENTER

BACKGROUND OF THE INVENTION

1. Field of the Invention

At least one embodiment in accordance with the present invention relates generally to systems and methods for data center management and design, and more specifically, to systems and methods for predicting maximum cooler and rack capacities and relevant temperatures in a data center.

2. Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed in specialized enclosures termed "racks" which integrate these connectivity, power and cooling elements. In some data center configurations, these rows are organized into hot and cold aisles to decrease the cost associated with cooling the information technology equipment. These characteristics make data centers a cost effective way to deliver the computing power required by many software applications.

Various processes and software applications, such as the InfrastruXure® Central product available from American Power Conversion Corporation of West Kingston, R.I., have been developed to aid data center personnel in designing and maintaining efficient and effective data center configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

BRIEF SUMMARY OF THE INVENTION

A first aspect of the invention is directed to a computer-implemented method for evaluating equipment in a data center, the equipment including a plurality of equipment racks, and at least one cooling provider. The method includes receiving data regarding each of the plurality of equipment racks and the at least one cooling provider, the data including a layout of the equipment racks and the at least one cooling provider, and a power draw value for each of the equipment racks, storing the received data, determining maximum cooler capacity for the at least one cooling provider based on the layout and the power draw, for each equipment rack, determining a maximum rack capacity based on the layout and the maximum cooler capacity, and displaying an indication of the maximum rack capacity for at least one equipment rack.

The at least one cooling provider may be a plurality of cooling providers, and the method may further include determining a maximum cooler capacity value for each cooling provider based on a maximum air return temperature to the plurality of cooling providers. In the method, determining the maximum rack capacity for each equipment rack may include determining the maximum rack capacity based on available space in each equipment rack and based on available power of each equipment rack. The method may further include determining cooling performance of each equipment rack based on air flows in the data center. The method may also include determining a cooling load for the at least one cooling provider based on an ambient temperature determined based on a difference between total cooling load in the data center and total power load in the data center. In the method, determining a cooling load for the at least one cooling provider may include determining the cooler load based on a cooler return temperature determined based on the ambient temperature, and displaying an indication of the maximum rack capacity may include displaying a model of the data center with the indication of the maximum rack capacity for an equipment rack displayed along with a model of the equipment rack.

Another aspect of the invention is directed to a system for evaluating equipment in a data center, the equipment including a plurality of equipment racks, and at least one cooling provider. The system includes an interface, and a controller coupled to the interface and configured to receive data regarding each of the plurality of equipment racks and the at least one cooling provider, the data including a layout of the equipment racks and the at least one cooling provider, and a power draw value for each of the equipment racks, store the received data in a storage device associated with the system, determine a maximum cooler capacity value for the at least one cooling provider based on the layout and the power draw, and for each equipment rack, determine a maximum rack capacity based on the layout and the maximum cooler capacity value.

In the system, the at least one cooling provider may be a plurality of cooling providers, and the controller may be further configured to determine a maximum cooler capacity value for each of the plurality of cooling providers. The controller may be configured to determine the maximum rack capacity based on available space in each equipment rack and based on available power of each equipment rack. The controller may be further configured to determine cooling performance of each equipment rack based on air flows in the data center, and to determine cooler load for the at least one cooling provider based on an ambient temperature determined based on a difference between total cooling load in the data center and total power load in the data center. The controller may also be configured to determine the cooling load based on a cooler return temperature determined based on the ambient temperature. The system may further include a display coupled to the controller, and the controller may be configured to display an indication of the maximum rack capacity.

Another aspect of the invention is directed to a computer readable medium having stored thereon sequences of instruction including instructions that will cause a processor to receive data regarding each of a plurality of equipment racks and at least one cooling provider, the data including a layout of the equipment racks and the at least one cooling provider, and a power draw value for each of the equipment racks, store the received data in a storage device, determine a maximum cooler capacity value for the at least one cooling provider based on the layout and the power draw; and for each equipment rack, determine a maximum rack capacity based on the layout and the maximum cooler capacity value.

The at least one cooling provider may be a plurality of cooling providers, and the sequences of instructions may include instructions that will cause the processor to determine a maximum cooler capacity value for each cooling provider, and determine the maximum rack capacity based on available space in each equipment rack and based on available power of each equipment rack. The sequences of instructions may include instructions that will cause the processor to determine cooling performance of each equipment rack based on air flows in the data center. The sequences of instructions may include instructions that will cause the processor to determine a cooling load for the at least one cooling provider based on an ambient temperature determined based on a difference between total cooling load in the data center and total power load in the data center. The sequences of instructions may also include instructions that will cause the processor to determine the cooler load based on a cooler return temperature determined based on the ambient temperature.

Another aspect is directed to a computer-implemented method for evaluating cooling performance of equipment in a data center, the equipment including a plurality of equipment racks, and at least one cooling provider. The method includes receiving data regarding each of the plurality of equipment racks and the at least one cooling provider, the data including a layout of the equipment racks and the at least one cooling provider, and a power draw value for each of the equipment racks, storing the received data, determining air flow between the at least one cooling provider and each of the equipment racks, determining inlet and exit air temperature for the at least one cooling provider based on the layout, the power draw and the airflow, for each equipment rack, determining inlet and exit air temperature based on the layout, the power draw and the airflow, and displaying an indication of the inlet and exit temperature for each of the plurality of equipment racks and the at least one cooler. In the method, determining the inlet and exit temperature of each of the equipment racks and the at least one cooling provider may include establishing a set of S coupled equations, with S equal to a number of temperature values to be determined, and solving the S coupled equations.

In the method, the at least one cooling provider may be a plurality of cooling providers, and the method may further include determining a maximum cooler capacity value for each cooling provider based on a maximum inlet air temperature to the plurality of cooling providers. The method may further include determining maximum rack capacity for each equipment rack based on available space in each equipment rack, based on available power of each equipment rack, and based on the maximum cooler capacity of at least one of the plurality of cooling providers. The method may further include determining an ambient air temperature in the data center based on air flows in the data center. In the method, N is equal to a number of cooling providers in the data center, n is equal to a number of the plurality of equipment racks, and S is equal to two times N plus two times n plus one. In the method, solving the S coupled equations may include solving at least one piece-wise linear equation of the S coupled equations by identifying a breakpoint in the piece-wise linear equation and using a different linear equation before and after the breakpoint. In the method, solving the S coupled equations may include using an iterative process to repeatedly solve the S coupled equations to reach a final value for the inlet and exit temperature of each of the equipment racks and the at least one cooling provider. In the method, displaying an indication of the inlet and exit temperature for each of the plurality of equipment racks and the at least one cooler may include displaying a model of the data center with the indication displayed on the model.

In yet another aspect, a system is provided for evaluating equipment in a data center, the equipment including a plurality of equipment racks, and at least one cooling provider. The system includes an interface, and a controller coupled to the interface and configured to receive data regarding each of the plurality of equipment racks and the at least one cooling provider, the data including a layout of the equipment racks and the at least one cooling provider, and a power draw value for each of the equipment racks, store the received data in a storage device associated with the system, determine inlet and exit temperatures for the at least one cooling provider and for each of the plurality of equipment racks based on the data received by establishing a set of S coupled equations, with S equal to a number of temperature values to be determined, and solving the S coupled equations.

In the system, the at least one cooling provider may be a plurality of cooling providers, and the controller may be further configured to determine a maximum cooler capacity value for each of the plurality of cooling providers based on a maximum inlet temperature of the plurality of cooling providers. In the system, determine the maximum rack capacity for each equipment rack includes determine the maximum rack capacity based on available space in each equipment rack and based on available power of each equipment rack. In the system, the controller may be further configured to determine an ambient air temperature in the data center based on air flows in the data center. In the system, with N equal to a number of cooling providers in the data center, and with n equal to a number of the plurality of equipment racks, S is equal to two times N plus two times n plus one. In the system, solving the S coupled equations may include solving at least one piece-wise linear equation of the S coupled equations by identifying a breakpoint in the piece-wise linear equation and using a different linear equation before and after the breakpoint. In the system, solving the S coupled equations may include using an iterative process to repeatedly solve the S coupled equations to reach a final value for the inlet and exit temperature of each of the equipment racks and the at least one cooling provider.

Another aspect of the invention is directed to a computer readable medium having stored thereon sequences of instruction including instructions that will cause a processor to receive data regarding each of the plurality of equipment racks and the at least one cooling provider, the data including a layout of the equipment racks and the at least one cooling provider, and a power draw value for each of the equipment racks, store the received data in a storage device associated with the system, determine inlet and exit temperatures for the at least one cooling provider and for each of the plurality of equipment racks based on the data received by establishing a set of S coupled equations, with S equal to a number of temperature values to be determined, and solving the S coupled equations.

The at least one cooling provider may be a plurality of cooling providers, and the sequences of instructions may include instructions that will cause the processor to determine a maximum cooler capacity value for each of the plurality of cooling providers based on a maximum inlet temperature of the plurality of cooling providers. The sequences of instructions may include instructions that will cause the processor to determine an ambient air temperature in the data center based on air flows in the data center.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
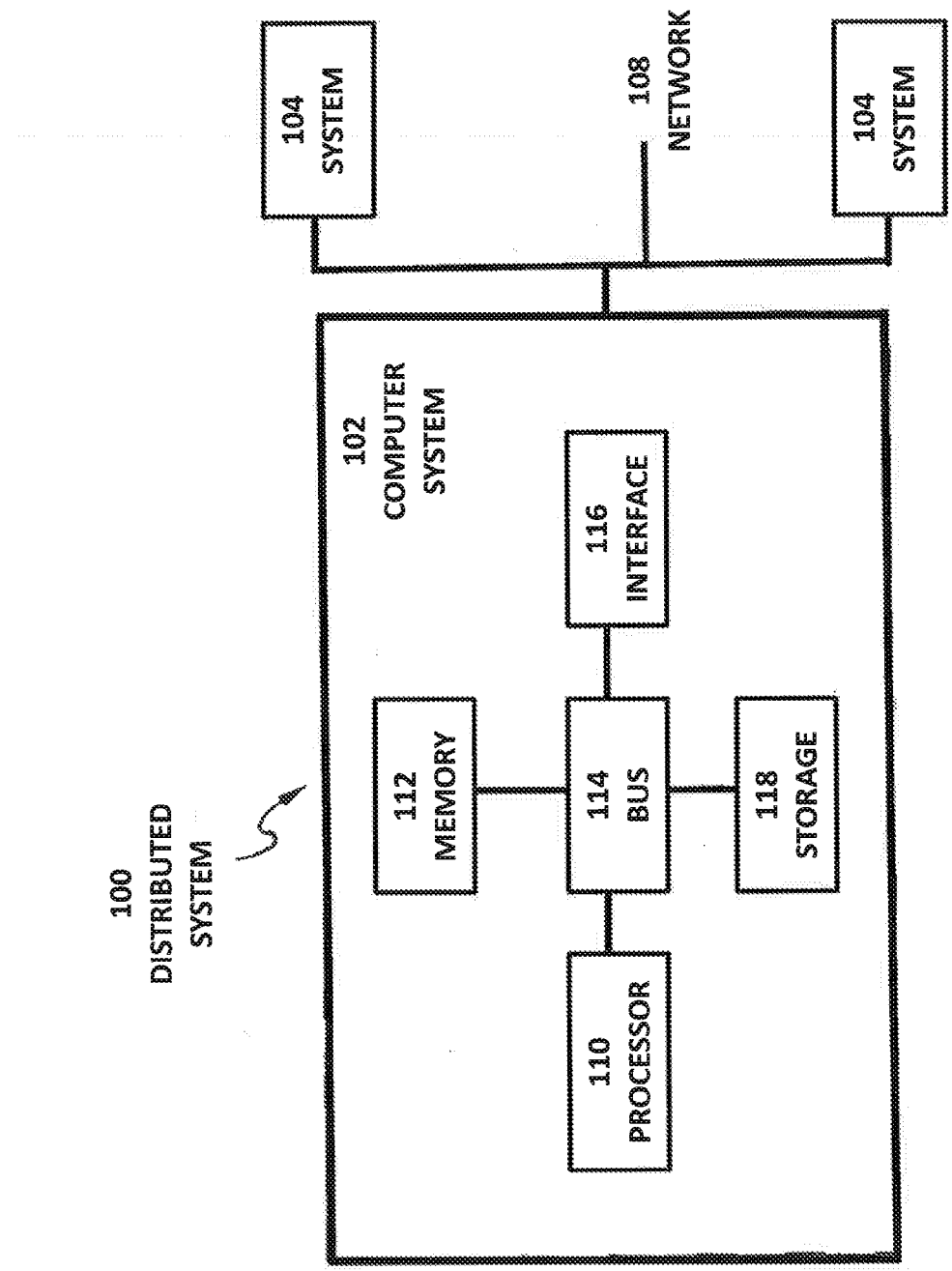
FIG. 1 shows an example computer system with which various aspects in accord with the present invention may be implemented.

At least some embodiments in accordance with the present invention relate to systems and processes through which a user may design and analyze data center configurations. These systems and processes may facilitate this design and analysis activity by allowing the user to create models of data center configurations from which performance metrics may be determined. Both the systems and the user may employ these performance metrics to determine alternative data center configurations that meet various design objectives.

As described in U.S. patent application Ser. No. 12/019,109, titled "System and Method for Evaluating Equipment Rack Cooling", filed Jan. 24, 2008 (referred to herein as "the '109 Application"), and in U.S. patent application Ser. No. 11/342,300, titled "Methods and Systems for Managing Facility Power and Cooling" filed Jan. 27, 2006 (referred to herein as "the '300 application"), both of which are assigned to the assignee of the present application, and both of which are hereby incorporated herein by reference in their entirety, typical equipment racks in modern data centers draw cooling air in the front of the rack and exhaust air out the rear of the rack. The equipment racks, and in-row coolers are typically arranged in rows in an alternating front/back arrangement creating alternating hot and cool aisles in a data center with the front of each row of racks facing the cool aisle and the rear of each row of racks facing the hot aisle. Adjacent rows of equipment racks separated by a cool aisle may be referred to as a cool aisle cluster, and adjacent rows of equipment racks separated by a hot aisle may be referred to as a hot aisle cluster. Further, single rows of equipment may also be considered to form both a cold and a hot aisle cluster by themselves. As readily apparent to one of ordinary skill in the art, a row of equipment racks may be part of multiple hot aisle clusters and multiple cool aisle clusters. In descriptions and claims herein, equipment in racks, or the racks themselves, may be referred to as cooling consumers, and in-row cooling units and/or computer room air conditioners (CRACs) may be referred to as cooling providers. In the referenced applications, tools are provided for analyzing the cooling performance of a cluster of racks in a data center. In these tools, multiple analyses may be performed on different layouts to attempt to optimize the cooling performance of the data center.

In at least one embodiment, a method is provided for performing in real-time an analysis on a layout of equipment in a data center, for determining the maximum capacity of coolers in the layout, and based on the maximum capacity of the coolers, and other considerations discussed below, providing the maximum electrical load for equipment racks co-located with the coolers. The method may be incorporated in a system or tool having capabilities for predicting the cooling performance of clusters and for performing other design and analysis functions of equipment in a data center. Further in at least some embodiments, methods and tools provide predictions of air temperatures at inlets and exits of equipments racks and cooling providers and the ambient temperature of a data center.

The aspects disclosed herein in accordance with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling and presenting information regarding specific data center configurations. Further, computer systems in embodiments may be used to automatically measure environmental parameters in a data center, and control equipment, such as chillers or coolers to optimize performance. Moreover, the systems described herein may be configured to include or exclude any of the functions discussed herein. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present invention may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present invention may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accordance with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. Distributed computer system 100 may include one more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems may exchange data. To exchange data using network 108, computer systems 102, 104 and 106 and network 108 may use various methods, protocols and standards, including, among others, token ring, ethernet, wireless ethernet, Bluetooth, TCP/IP, UDP, Http, FTP, SNMP, SMS, MMS, SS7, Json, Soap, and Corba. To ensure data transfer is secure, computer systems 102, 104 and 106 may transmit data via network 108 using a variety of security measures including TSL, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present invention may be implemented as specialized hardware or software executing in one or more computer systems including computer system 102 shown in FIG. 1. As depicted, computer system 102 includes processor 110, memory 112, bus 114, interface 116 and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable nonvolatile storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then copies the data to the medium associated with storage system 118 after processing is completed. A variety of components may manage data movement between the medium and integrated circuit memory element and the invention is not limited thereto. Further, the invention is not limited to a particular memory system or storage system.

Although computer system 102 is shown by way of example as one type of computer system upon which various aspects and functions in accordance with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the present invention may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the present invention may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used. Further, in at least one embodiment, the tool may be implemented using VBA Excel.

A computer system included within an embodiment may perform additional functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of Uppsala, Sweden or integration software such as Web Sphere middleware from IBM of Armonk, N.Y. However, a computer system running, for example, SQL Server may be able to support both aspects in accord with the present invention and databases for sundry applications not within the scope of the invention.

Example System Architecture

Figure 2:
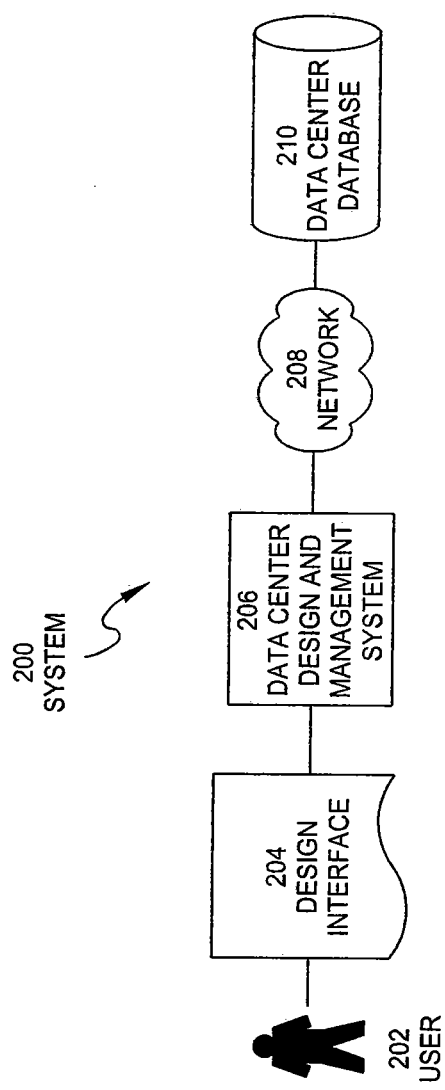
FIG. 2 illustrates an example distributed system including an embodiment.

FIG. 2 presents a context diagram including physical and logical elements of distributed system 200. As shown, distributed system 200 is specially configured in accordance with the present invention. The system structure and content recited with regard to FIG. 2 is for exemplary purposes only and is not intended to limit the invention to the specific structure shown in FIG. 2. As will be apparent to one of ordinary skill in the art, many variant system structures can be architected without deviating from the scope of the present invention. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the invention.

Referring to FIG. 2, system 200 includes user 202, interface 204, data center design and management system 206, communications network 208 and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of a data center or any subset thereof. This layout may include representations of data center structural components as well as data center equipment. The features of interface 204, as may be found in various embodiments in accordance with the present invention, are discussed further below. In at least one embodiment, information regarding a data center is entered into system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents data design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data.

As illustrated, data center design and management system 206 may exchange information with data center database 210 via network 208. This information may include any information required to support the features and functions of data center design and management system 206. For example, in one embodiment, data center database 210 may include at least some portion of the data stored in the data center equipment database described in PCT/US08/63675. In another embodiment, this information may include any information required to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one embodiment, data center database 210 may store types of cooling providers, the amount of cool air provided by each type of cooling provider, and a temperature of cool air provided by the cooling provider. Thus, for example, data center database 210 includes records of a particular type of CRAC unit that is rated to deliver airflow at the rate of 5,600 cfm at a temperature of 68 degrees Fahrenheit. In addition, the data center database 210 may store one or more cooling metrics, such as inlet and outlet temperatures of the CRACs and inlet and outlet temperatures of one or more equipment racks. The temperatures may be periodically measured and input into the system, or in other embodiments, the temperatures may be continuously monitored using devices coupled to the system 200.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Figure 3:
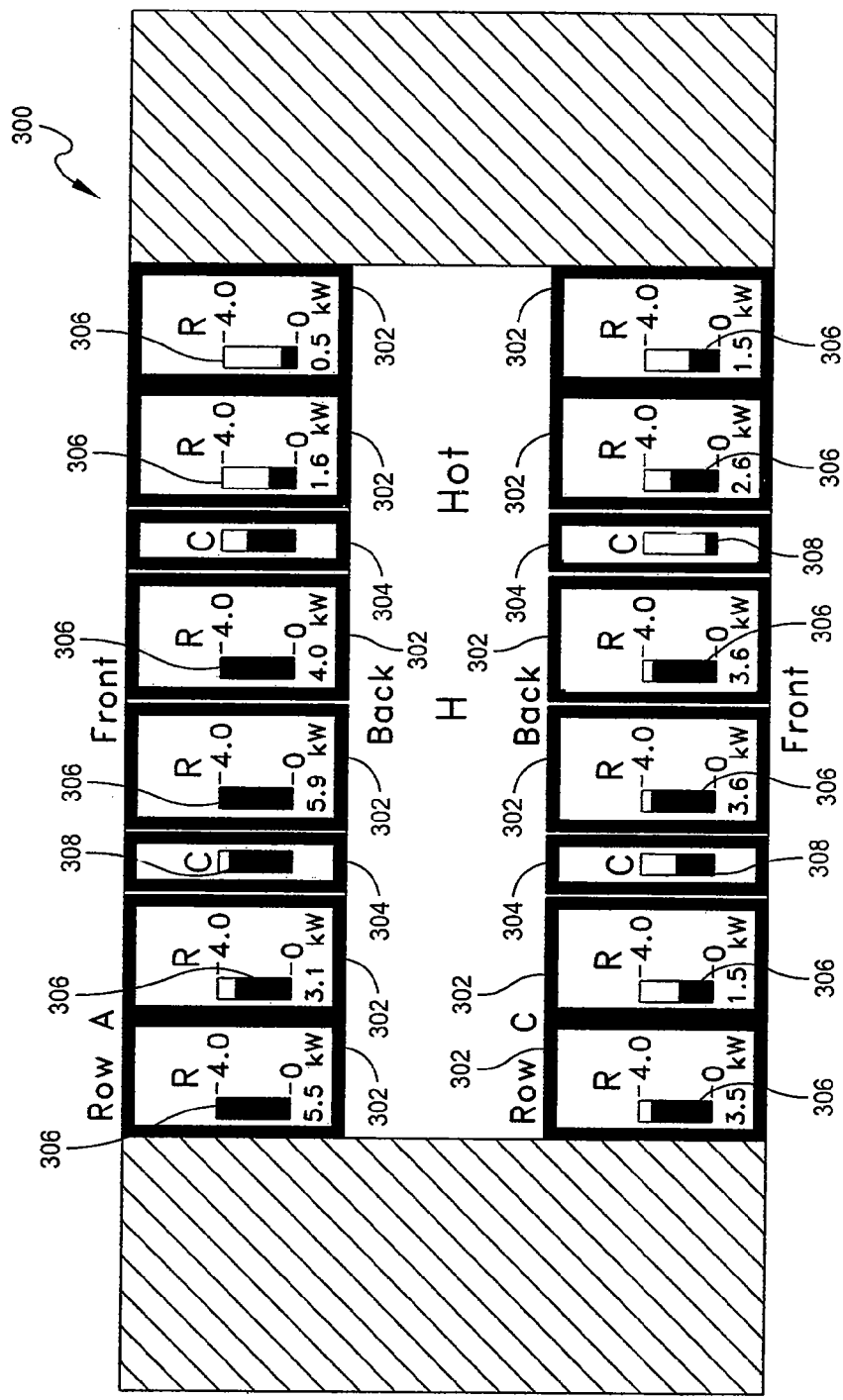
FIG. 3 shows an example of a display screen in accordance with one embodiment of the invention.

In at least one embodiment, which will now be described, a tool is provided for determining the maximum cooler capacity of a cooler as installed in a data center, for determining the maximum rack load that can be placed at a rack position in the data center, based at least in part on the maximum cooler capacity, and for determining cooler return temperature for one or more coolers in the data center. Once determined, the current cooling load relative to the maximum cooler capacity may be displayed for each cooler on a representation of the cooler on a layout of the data center using for example a bar chart. FIG. 3 shows a model of a hot aisle cluster 300 of equipment racks 302 and in-row coolers 304 in a data center that may be displayed using a system in accordance with one embodiment. The displayed model of the cluster includes a bar graph 306 on each rack that provides an indication of the maximum rack load for each rack and an indication of what part or percentage of that maximum rack load is presently being utilized. In one embodiment, the maximum rack load may be determined based on the lesser of the maximum power available to the rack and the maximum cooling capacity of the rack. Similarly, the displayed model of the cluster includes a bar graph 308 on each cooler that provides an indication of the maximum cooler capacity of each cooler and the current cooling load for each cooler.

While FIG. 3 uses bar graphs to provide indications of capacity and current loading, in other embodiments, other graphical and numerical representations may be used. Systems, tools and methods for determining the capacities and loading shown in FIG. 3 in embodiments of the invention will now be described. In other embodiments, in addition to or in place of showing capacity and loading, critical temperatures in a data center may be determined and displayed. The critical temperatures may include the inlet and outlet temperature of racks, inlet and outlet temperatures of coolers, and the ambient temperature of the room. These temperature values may be intermediate values in determining capacity values, and while they may not provide as much information to a user of a data center, they are more generally understood and can be more easily verified with simple temperature measurements.

The current cooling load for an installed cooler can be monitored (directly or indirectly) in real time, and a fixed nominal capacity for a cooler (e.g. 17 kW) can be determined for a cooler from manufacturing specifications. The installed maximum cooler capacity is more complex and in at least one embodiment described herein is determined based on the building cooling infrastructure (e.g. water/glycol flow rates and temperatures for chilled water units) and the return air temperature to the cooler. As the maximum cooler capacity increases with return temperature, the maximum cooler capacity for a given installation will be achieved at maximum return air temperature. Thus in one embodiment, to estimate the maximum cooler capacity, the details of the building cooling infrastructure are used along with a practical maximum return air temperature that is estimated based on the data center environment (location, airflow, and power of IT equipment, geometric details, etc.) in the neighborhood of the cooler. In one embodiment, in generating this estimate, it is assumed that any remaining space in equipment racks in the neighborhood of a cooler will be filled with IT equipment of the same type and maximum power as presently exists on average. Procedures used to compute the maximum cooler capacity are described in further detail below.

In at least one embodiment, procedures for computing the maximum power load that may be installed in any given rack account for the fact that the load in one rack affects the cooling performance of other racks in the neighborhood. In computing the maximum equipment that can be installed in any one rack, the power in that rack is iteratively adjusted (increased) just to the point of a predicted cooling failure anywhere in the neighborhood. As rack power is increased, at some point the maximum cooler capacity may be exceeded, indicating that the cooler will no longer be able to meet the specified target supply temperature (i.e. it cannot cool the air all the way down to the set point), and in some embodiments, this indicates that maximum rack power has been reached. In other embodiments, some increase in supply temperature (particularly for just one cooler) may be acceptable, but as the supply temperature approaches the maximum desired rack inlet temperatures (e.g. 77° F.), cooling performance will typically become unacceptable. In at least one embodiment, maximum rack power calculations are performed as if all other racks remain at their current power level and, as soon as additional load is added to any one rack, the maximum rack capacity at other nearby rack locations will generally be reduced.

Figure 4:
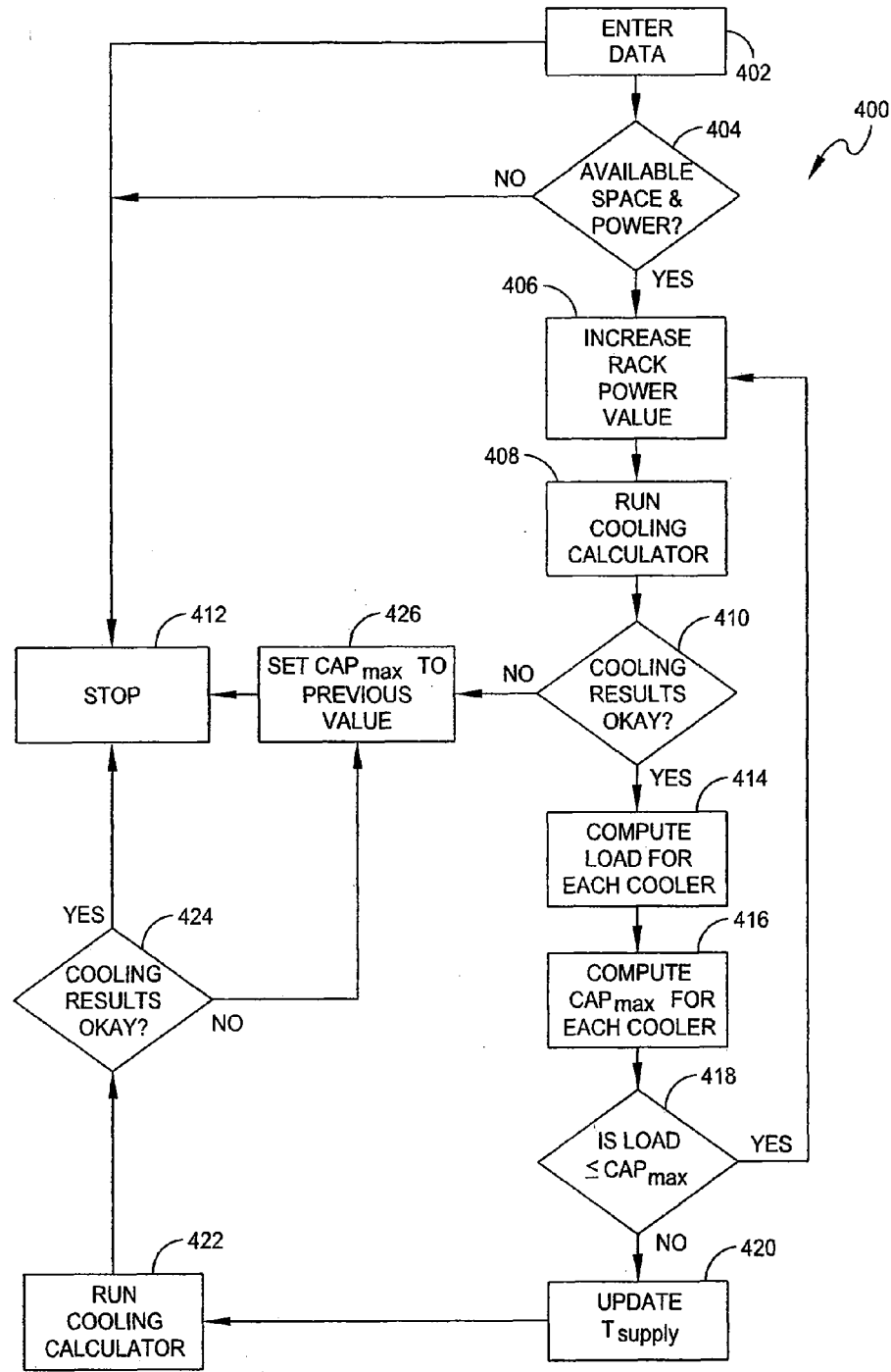
FIG. 4 shows a flowchart of a first process in accordance with one embodiment of the invention.

In one embodiment, before determining the maximum rack power for each rack, the maximum cooler capacity for each cooler in the cluster is determined using process 400 shown in FIG. 4 below. In general, the capacity of a cooler increases with an increase in return temperature to the cooler, and in process 400, the power loading of each rack in the cluster is increased up to a maximum power level limit for the cluster at which specified cooling criteria for the cluster are still met. At the maximum power level limit, a maximum return temperature for the cluster will be realized, and based on the maximum return temperature, the maximum power level for each cooler, as laid out in the cluster, can be determined.

In a first stage 402 of the process 400, information regarding a data center, including details on a particular cluster to be analyzed, is entered into the system. The information includes identifying information for cooling units in the cluster. The information may be entered manually by a user, provided to the system electronically, or may have previously been entered and stored in the system. In one embodiment, at least some of the information may be sensed by the system using sensors installed in the data center and/or through direct communication with the cooler over a communications network. In one embodiment, the information entered includes, for each cooler, the type of cooler (e.g. model number), the coolant type, the entering coolant temperature to the cooler, the current cooler water flow rate, and the valve position (from 0 to 100%) of the valve which determines how much coolant is distributed directly through the cooling coil and how much is diverted as bypass flow.

At stage 404 a determination is made as to whether there is available space and power in the racks of the cluster. If the outcome of stage 404 is NO, then process 400 ends at stage 412. In a situation where there is no additional power and space available in any of the racks, then each of the racks is operating at its maximum capacity. If the outcome of stage 404 is YES, then at stage 406, the power value for each of the racks having available power and space is increased by an incremental amount. In different embodiments of the invention, different schemes may be used for raising the power value for the racks. In one embodiment, each of the racks may be raised by a same amount (limited by total power and space availability), while in other embodiments, each may be raised by a similar percentage.

At stage 408, a cooling analysis is performed on the cluster using a cooling calculator. For the additional power added to the equipment racks being evaluated, in one embodiment, the additional cooling air flow (expressed in cfm/kW) is based on the average air flow requirements for the existing equipment in the equipment rack. In typical equipment racks used in data centers, a value of 160 cfm/kw can be used to determine required air flow based on power draw of the equipment. The cooling calculator used at stage 408 can be one of the calculators described in the '109 and '300 patent applications discussed above. In one embodiment, the cooling calculator uses the algebraic calculator for determining capture index (CI) discussed in the '109 application. The cold-aisle capture index for a rack is defined in at least some embodiments as the fraction of air ingested by the rack which originates from local cooling resources (e.g., perforated floor tiles or local coolers). The hot-aisle capture index is defined as the fraction of air exhausted by a rack which is captured by local extracts (e.g., local coolers or return vents). CI therefore varies between 0 and 100% with better cooling performance generally indicated by greater CI values. In a cold-aisle analysis, high CI's ensure that the bulk of the air ingested by a rack comes from local cooling resources rather than being drawn from the room environment or from air which may have already been heated by electronics equipment. In this case, rack inlet temperatures will closely track the perforated-tile airflow temperatures and, assuming these temperatures are within the desired range, acceptable cooling will be achieved. In a hot-aisle analysis, high CI's ensure that rack exhaust is captured locally and there is little heating of the surrounding room environment.

While good (high) CI values typically imply good cooling performance; low CI values do not necessarily imply unacceptable cooling performance. For example, in a rack in a raised-floor environment which draws most of its airflow from the surrounding room environment rather than from the perforated tiles, the rack's cold-aisle CI will be low; however, if the surrounding room environment is sufficiently cool, the rack's inlet temperature may still be acceptable. In this case, the rack's cooling needs are met by the external room environment rather than perforated tiles within the rack's cluster. If this process is repeated many times across the data center, facility cooling will be complex and may be unpredictable. High CI values lead to inherently scalable cluster layouts and more predictable room environments. In one embodiment of the present invention, the cooling performance of the cluster is considered satisfactory if the CI for all racks in the cluster is greater than 90% although this threshold typically increases as cooler supply and surrounding ambient temperatures approach the maximum target rack inlet temperature. In other embodiments, other cooling calculators may be used including CFD calculators.

At stage 410, a determination is made based on the results of the cooling analysis as to whether the cooling performance of the cluster is satisfactory. If the outcome of stage 410 is NO, then the process proceeds to stage 426 discussed below, where the maximum cooler capacity is set to the previous value. If the outcome of stage 410 is NO on the first iteration through process 400, then the there is no previous value computed for the maximum cooler capacity, and the maximum cooler capacities are determined using processes 500 and 600 discussed below. If the outcome of stage 410 is YES, then the process proceeds to stage 414, where the Load of each cooler in the cluster is determined The Load for a cooler is the rate at which heat is removed by the cooler under calculated conditions. In one embodiment, the Load is determined using Equation (1) below:

$$\text{Load} = \rho Q^{air} c_p (T_{return} - T_{set\,point}) \qquad \text{Equation (1)}$$

Where: $\rho$ is the density of air=1.19 kg/m$^3$
$Q^{air}$ is the cooler airflow rate (maximum rated airflow for cooler type
$c_p$ is the specific heat of air=1005 J/(kg° C.)
$T_{return}$ is the cooler air return temperature determined above
$T_{set\,point}$ is the cooler airflow supply temperature set point At stage 416, the maximum cooler capacity for each cooler in the cluster is determined based on current operating conditions of the cluster. In one embodiment, the process used for determining maximum cooling capacity differs based on whether the particular cooler is a chilled water cooling unit or a direct expansion (DX) cooling unit. A process 500 for determining maximum cooling capacity for chilled water cooling units is discussed below with reference to FIG. 5, and a process 600 for determining maximum cooling capacity for DX cooling units is described below with reference to FIG. 6.

Next, at stage 418, a determination is made as to whether the Load for each cooler is less than or equal to the maximum cooler capacity Cap$_{max}$. If the outcome of stage 418 is YES, then the process returns to stage 406, where the rack power for all racks is incrementally increased again. If the outcome of stage 418 is NO, then the process 400 proceeds to stage 420 where the cooler airflow supply temperature, which is subject to the Cap$_{max}$ limit, is updated using Equation (2) below:

$$T_{supply} = T_{return} - Cap_{max}/(\rho Q^{air} c_p) \qquad \text{Equation (2)}$$

At stage 418, a "No" is achieved if cooling capacity is insufficient for any one or more coolers.

After the supply temperature is updated, the process proceeds to stage 422, where the cooling calculator is run again using the new value for supply temperature. At stage 424, a determination is made again as to whether the cooling results for the cluster are satisfactory. If the outcome of stage 424 is YES, then the process ends at stage 412 with the maximum cooler capacity for each of the coolers set equal to the value most recently determined at stage 416. If the outcome of stage 424 is NO, then the maximum cooler capacity for each of the coolers is set to the previous value at stage 426 and the process then ends at stage 412.

Figure 5:
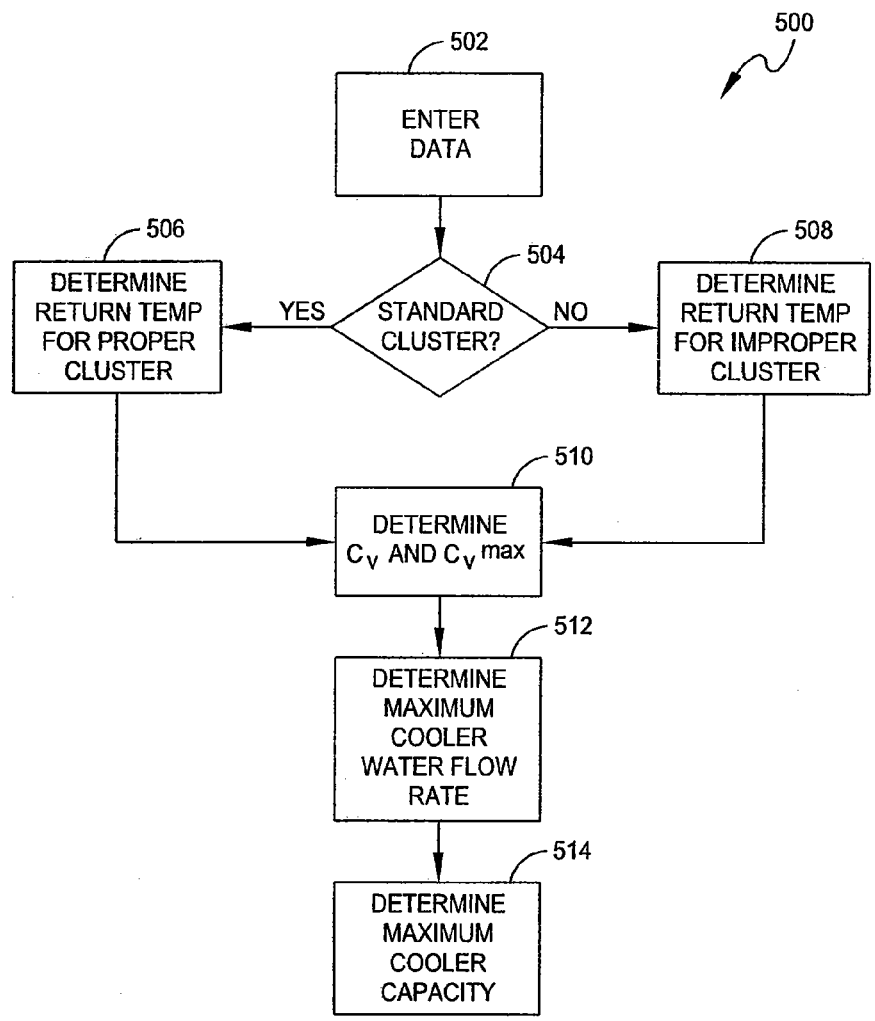
FIG. 5 shows a flowchart of a second process in accordance with one embodiment of the invention.

FIG. 5 provides a flowchart for a process 500 that may be used in a data center management system in accordance with one embodiment for computing maximum cooler capacity for chilled water cooling units in a data center, such as one of the coolers 306 of FIG. 3. In the exemplary embodiment, which will now be described, the process applies to InRow RC and RP chilled water units available from American Power Conversion Corporation by Schneider Electric, but as readily understood by one of ordinary skill in the art given the benefit of this disclosure, the process may be used with other chilled water units.

In a first stage 502 of the process 500, information regarding a data center, including details on a particular cluster to be analyzed, is entered into the system. This may be the same information entered in stage 402 of process 400 discussed above, and if entered in process 400, stage 502 may be skipped.

At stage 504 in the process, a determination is made as to whether the cluster is a proper cluster. A proper cluster is a grouping of two approximately-equal-length rows of equipment separated by a common cold or hot aisle; there are no gaps between equipment in the rows. At stage 506, for a proper cluster, the return temperature for each cooler in the cluster is calculated. In one embodiment, the return temperature for a proper cluster is determined as described in the '109 application referenced above, while in other embodiments, the return temperature is determined using one of the processes described below. At stage 508, for improper clusters, in one embodiment, the return temperature is estimated using one of the processes described further below. In other embodiments, for both proper and improper clusters, the return temperature may be determined using a full computational fluid dynamics (CFD) analysis, but such an analysis can not typically be performed in real time.

Once the return temperature has been determined at either stage 506 or 508, then at stage 510, the flow coefficient at current valve position ($C_v$) and the flow coefficient at maximum valve opening ($C_v^{max}$) are determined. The flow coefficient $C_v$ relates the coolant flow rate to the square root of the pressure drop across the bypass valve: $Q = C_v \sqrt{\Delta P}$ and may be needed to compute the maximum coolant flow rate through the cooling coil of the cooling unit. In one embodiment, $C_v$ and $C_v^{max}$ may be determined from data provided by the manufacturer of the cooler. The manufacturer's data for the cooling units may be stored in a system performing the process 500. At stage 512, the maximum cooler water flow rate as installed ($Q_{max}$) is determined. In one embodiment, $Q_{max}$ is determined using Equation (3) below:

$$Q_{max} = \text{Min}\left(\frac{C_v^{max}}{C_v} Q, 21 GPM\right) \quad \text{Equation (3)}$$

Where Q=the current coolant flow rate. In some embodiments, the cooling capacity is capped at particular flow rate (e.g. 21 GPM) which may be dictated by considerations such as the life cycle of the coil and piping systems.

In other embodiments, the maximum coolant flow rate may be known (e.g. directly reported by the cooling unit). In this case, there is no need for calculations involving flow coefficients.

In the last stage 514 of the process, the maximum cooler capacity $Cap_{max}$ is determined using information provided by the cooler manufacturer's specifications based on the entering water temperature (EWT), the return temperature and $Q_{max}$. In some embodiments, if a coolant other than water is used (for example, a glycol mixture), then a correction factor may be provided to the determined maximum cooler capacity.

The process 500 may be performed for coolers in a cluster individually, although return temperatures may be determined for all coolers in a cluster simultaneously using a cluster calculator as described below. In one embodiment, return temperature values are determined using maximum cooler airflow values.

Figure 6:
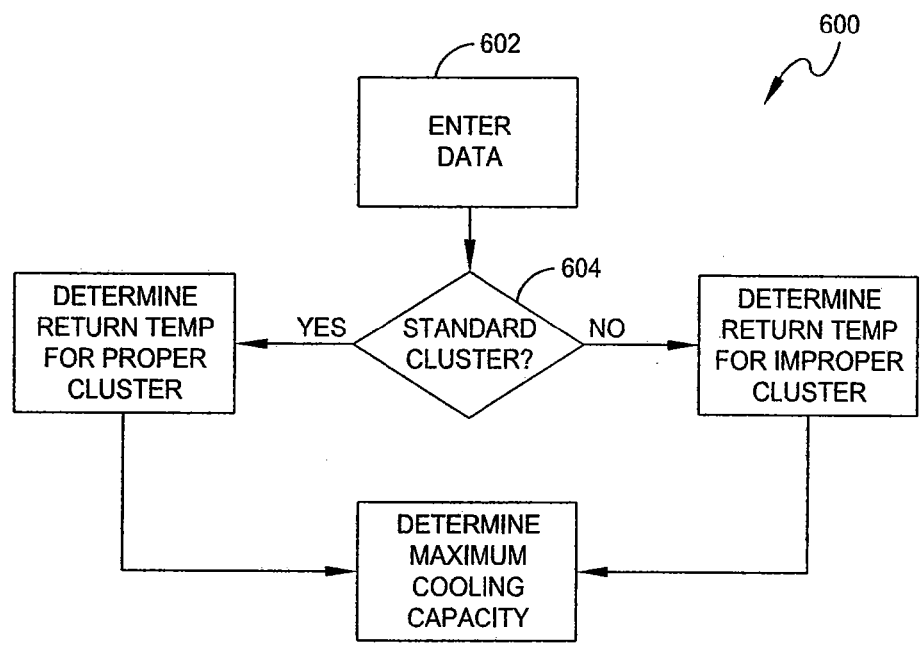
FIG. 6 shows a flowchart of a third process in accordance with one embodiment of the invention.

A process 600 used for predicting maximum cooler capacity for direct expansion (DX) cooling units will now be described with reference to FIG. 6 which shows a flowchart of the process 600. In a first stage 602 of the process 600, information regarding a data center, including details on a particular cluster to be analyzed, is entered into the system. This may be the same information entered in stage 402 of process 400 discussed above, and if entered in process 400, stage 602 may be skipped. At stage 604 in the process, a determination is made as to whether the cluster is a proper cluster, and at either stage 606 (for a proper cluster) or at stage 508 (for an improper cluster), the cooler return temperature is determined for each cooler in the cluster using the same procedure as in process 500 discussed above. At stage 610 in the process, the maximum cooling capacity ($Cap_{max}$) for each cooler is determined using the return temperature and manufacturer's specifications for the cooler.

Figure 7:
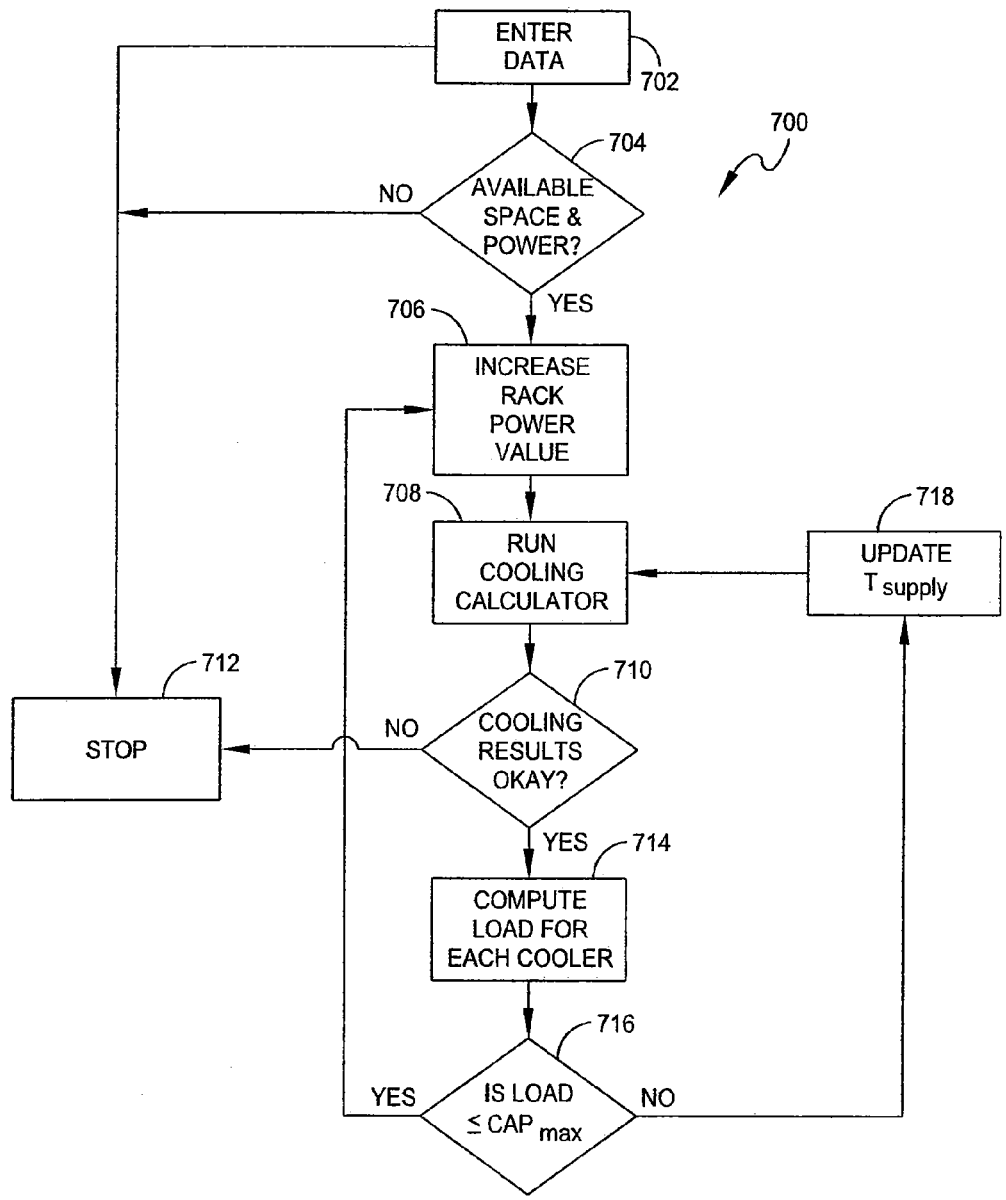
FIG. 7 shows a flowchart of a fourth process in accordance with one embodiment of the invention.

After computing the maximum capacity of the coolers in the cluster, in one embodiment, the maximum rack capacity is determined using the process 700 shown in flowchart form in FIG. 7. Process 700 is similar in some aspects to process 400 discussed above, except that process 700 is preformed individually for each equipment rack in a cluster. In a first stage 702 of the process 700, information regarding a data center, including details on a particular cluster to be analyzed is entered in to a system configured to perform the process 700. As with processes 500 and 600, the information may be entered into the system in a number of different ways. The information may include cooler specific information entered and or determined in processes 400, 500 and 600 above. In at least one embodiment, the process 700 is performed using the same system used to determine $Cap_{max}$ for the coolers in the cluster.

At stage 704 of the process, a determination is made based on the information entered regarding the cluster as to whether there is available space and available power in a first equipment rack being evaluated. If the outcome of stage 704 is NO, then the process ends. If the outcome of stage 704 is YES, then the process proceeds to stage 706, where the power value for the rack being evaluated is increased by an incremental amount. The incremental increase may in some embodiments be user selectable while in other embodiments, the incremental increase may be a default value set in the system. In other embodiments, the incremental increase may be determined, based at least in part, on the amount of available power in the equipment rack. In one embodiment, the incremental increase is a small fraction, e.g. 10% of the maximum additional load that may be added to the rack based on available electrical power capacity.

In other embodiments, other approaches can be used to establish the incremental rack-loading changes so that greater precision in determining maximum rack capacity can be achieved with fewer iterations. In one such embodiment in particular, the iterative process proceeds as follows. First, a lower bound on acceptable-cooling-performance rack load is determined. This is typically taken as the current rack load (at which cooling performance is known to be acceptable) as a starting point. Second, an upper bound on acceptable-cooling-performance rack load is determined. This is typically taken as the maximum additional load possible given electrical power capacity as a starting point. In subsequent iterations, rack-load operating points are tested which fall halfway between the previously tested points. In this manner, the iterative "search space" is continually halved leading to much faster convergence than is achieved with the simple fixed-load-increment approach of FIG. 7. As an example, consider a rack which is currently operating at 4 kW with known acceptable cooling performance. Cooling performance is tested at its maximum electrical power limit of 10 kW and found unacceptable. The next operating point tested is (4+10 kW)/2=7 kW and found to be acceptable. So, the maximum rack load is now known to be between 7 kW and 10 kW so that the next point tested is (7+10 kW)/2=8.5 kW. This process continues until the lower and upper limits on known acceptable cooling performance converge to within some practical tolerance. In one embodiment, process 400 discussed above may use a similar approach to the iterative process of increasing power for all of the racks.

At stage 708, a cooling analysis is performed on the cluster using a cooling calculator. For the additional power added to the equipment rack being evaluated, in one embodiment, the additional cooling air flow (expressed in cfm/kW) is based on the average air flow requirements for the existing equipment in the equipment rack. In typical equipment racks used in data centers, a value of 160 cfm/kw can be used to determine required air flow based on power draw of the equipment. The cooling calculator used at stage 708 can be one of the calculators described in the '109 and '300 patent applications discussed above. In one embodiment, the cooling calculator uses the algebraic calculator for determining capture index (CI) discussed in the '109 application. In one embodiment of the present invention, the cooling performance of the cluster is considered satisfactory if the CI for all racks in the cluster is greater than 90% although this threshold typically increases as cooler supply and surrounding ambient temperatures approach the maximum target rack inlet temperature. In other embodiments, other cooling calculators may be used including CFD calculators.

At stage 710, a determination is made based on the results of the cooling analysis as to whether the cooling performance of the cluster is satisfactory. If the outcome of stage 710 is NO, then the process proceeds to stage 712, where the process is completed as discussed below. If the outcome of stage 710 is YES, then the process proceeds to stage 714, where the Load of each cooler in the cluster is determined. The Load for a cooler is the rate at which heat is removed by the cooler under calculated conditions. In one embodiment, the Load is determined using Equation (4) below:

$$\text{Load} = \rho Q^{air} c_p (T_{return} - T_{set\,point}) \quad \text{Equation (4)}$$

Where: $\rho$ is the density of air=1.19 kg/m³
$Q^{air}$ is the cooler airflow rate (maximum rated airflow for cooler type
$c_p$ is the specific heat of air=1005 J/(kg° C.)
$T_{return}$ is the cooler air return temperature determined above
$T_{set\,point}$ is the cooler airflow supply temperature set point Next, at stage 716, a determination is made as to whether the Load for each cooler is less than or equal to the maximum cooler capacity $Cap_{max}$. The maximum cooler capacity for each cooler is determined in one embodiment using process 400 above. If the outcome of stage 716 is YES, then the process returns to stage 706, where the rack power is incrementally increased again. If the outcome of stage 714 is NO, then the process 700 proceeds to stage 718 where the cooler airflow supply temperature, which is subject to the $Cap_{max}$ limit, is updated using Equation (5) below:

$$T_{supply} = T_{return} - Cap_{max}/(\rho Q^{air} c_p) \quad \text{Equation (5)}$$

At stage 716, a "No" is achieved if cooling capacity is insufficient for any one or more coolers.

After the supply temperature is updated, the process returns to stage 708, where the cooling calculator is run again using the new value for supply temperature.

The process 700 continues until the power is increased to the point where there is not sufficient cooling air for the cluster, and the outcome of stage 710 is NO, indicating that the rack power has been increased to a level that is equal to or greater than the maximum rack capacity, and the process proceeds to stage 712, where process 700 is completed. In one embodiment, when stage 712 is reached, the rack power level is decreased by one increment to provide the maximum rack power level. In other embodiments, if it is desired to provide a finer resolution to the determination of the maximum rack power level, then after stage 712, the rack power level can be decreased by one increment and the process 700 can be performed again using smaller increments.

Processes 500 and 600 discussed above use estimated values for the cooler return temperatures for improper clusters. A first process for estimating cooler return temperatures in accordance with one embodiment of the invention will now be described. In the process, a single average cooler return temperature is determined rather than a cooler-by-cooler return temperature. A description of improper clusters is generally provided above. In one embodiment, when an improper cluster of equipment has a hot aisle width greater than six feet, then the cluster is evaluated as two separate improper clusters. Further, if there are partially aligned gaps in each row of an improper cluster, then the improper cluster is evaluated as two separate clusters separated by the gaps. The global average return temperature $T^c_{ave}$ is determined using Equation (6) below:

$$T^c_{ave} = \beta T^R_{ave} + (1-\beta) T_{amb} \quad \text{Equation (6)}$$

Where:
$T^c_{ave}$=global average cooler return temperature
$T_{amb}$=ambient temperature
$\beta$=the fraction of cooler airflow that comes directly from the racks ($0 \le \beta \le 1$)
$T^R_{ave}$=the average rack exhaust temperature In one embodiment, $\beta$ is determined using Equation (7) and $T^R_{av}$ is determined using Equation (8) below:

$$\beta = \frac{\sum_{i=1}^{n} CI_i Q_i^R}{\sum_j^N Q_j^C} \quad \text{Equation (7)}$$

$$T^R_{ave} = \frac{\sum_{i=1}^{n} Q_i^R T_i^R}{\sum_{i=1}^{n} Q_i^R} \quad \text{Equation (8)}$$

Where:
$CI_i$=hot aisle capture index of rack i
n=the number of racks
N=the number of coolers
$Q_j^C$=airflow rate of cooler j
$Q_i^R$=airflow rate of rack i In at least some embodiments, the CI's are unknown, and the CI's, or more directly, $\beta$ is estimated. For a global air ratio (AR) of less than one, the coolers are free to capture as much rack airflow as the airflow physics allows. However, when AR is greater than one, the coolers draw in additional "make up air" from the ambient which mixes with the rack airflow reducing the return temperature. In extreme situations for a very large AR, the cooler return temperature is equal to the ambient temperature. Considering the above, in one embodiment, the average cooler return temperature for an improper cluster is estimated using Equation (9) below, with the value of β in Equation (9) being determined using Equation (10) and Table 1:

$$T^c_{ave} = \beta T^R_{ave} + (1-\beta)T_{amb} \quad \text{Equation (9)}$$

$$AR = \frac{\sum_{i=1}^{N} Q_i^C}{\sum_{i=1}^{n} Q_i^R} = \text{the global air ratio} \quad \text{Equation (10)}$$

TABLE 1

| Value of β to Use in Eqn. 9 | | |
|---|---|---|
| Value of AR from Eqn. 10 | Open Aisle | HACS |
| AR < 1 | 0.80 | 0.95 |
| AR ≥ 1 | 0.80 | 0.95 |
|  | AR | AR |

As discussed above, for proper clusters, a number of different procedures can be used to determine the cooler return temperatures. An additional process for determining cooler return temperatures in accordance with one embodiment of the invention will now be described. The process may be particularly effective for coolers that draw a significant fraction of their return air directly from the ambient environment rather than directly from the racks.

Cooler return temperatures may be determined using Equation (11) below $$T_j^C = \frac{\sum_{i=1}^{n} f_{ij} Q_i^R T_i^R}{Q_j^C} \quad \text{Equation (11)}$$

Where:
$T_j^c$=the return temperature of cooler j
$f_{ij}$=the fraction of airflow from rack i that is captured by cooler j
$Q_i^R$=the airflow rate of rack i
$Q_j^c$=the airflow rate of cooler j
$T_i^R$=the exhaust temperature of rack i
n=the total number of racks After all cooler return temperatures for a cluster are computed by Equation 11, the effect of the ambient environment is accounted for by scaling all temperatures uniformly up or down until the overall average cooler return temperature is correct based on aggregate cluster rack airflow rates, exhaust temperatures, and CI's and cooler airflow rates.

In one embodiment of the present invention, a process for determining return temperature for coolers adds an additional term to Equation (11) to account for the amount of air drawn directly from the ambient environment by each cooler, and the resulting equation is shown below as Equation (12)

$$T_j^C = \frac{\sum_{i=1}^{n} f_{ij} Q_i^R T_i^R}{Q_j^C} + \left(1 - \frac{\sum_{i=1}^{n} f_{ij} Q_i^R}{Q_j^C}\right) T_{amb} \quad \text{Equation (12)}$$

where $T_{amb}$ is the ambient temperature of the surrounding room. Equation (12) provides the final cooler return temperatures. The $f_{ij}$ values in Equation (12) are determined as shown below in Equations (13) and (14).

For Racks in Row A and Coolers in Row A $$f_{ij} = \frac{(Q_{Aj})_{cap\,self} A e^{-B\Delta x}}{(Q_{Ai})_{sup\,net}} \quad \text{Equation (13)}$$

For Racks in Row A and Coolers in Row B $$f_{ij} = \frac{C(Q_{Bj})_{cap\,self} A e^{-B\Delta x}}{(Q_{Ai})_{sup\,net}} \quad \text{Equation (14)}$$

where
$(Q_{Aj})_{cap\,self}$=The airflow captured by the cooler at location $A_j$
$(Q_{Bj})_{cap\,self}$=The airflow captured by the cooler at location $B_j$
Δx=horizontal distance between locations (slots) i and j
A, B are empirical constants
C=empirical "coupling" constant accounting for effects from the opposite row Constants in one embodiment are A=1, B=0.25 and C varies with aisle width as summarized in the table below.

| Aisle Width (ft) | 3 | 3.5 | 4 | 4.5 | 5 | 5.5 | 6 |
|---|---|---|---|---|---|---|---|
| C | 0.75 | 0.63 | 0.5 | 0.48 | 0.45 | 0.43 | 0.4 |

And $$(Q_{Ai})_{sup\,net} = (Q_{Ai})_{sup\,self} + \sum_{all\ j \ne i} (Q_{Aj})_{sup\,self} A e^{-B\Delta x} + C\left\{(Q_{Bi})_{sup\,self} + \sum_{all\ j \ne i} (Q_{Bj})_{sup\,self} A e^{-B\Delta x}\right\} \quad \text{Equation (15)}$$

As readily understood by one of ordinary skill in the art given the benefit of this disclosure, calculations for racks in Row B follow analogous equations.

As discussed further above, CI values in embodiments of the present invention may be determined as discussed in the '109 and '300 applications, and in addition, CI values may be determined using Equation (16) below:

$$CI_i = \sum_{j=1}^{N} f_{ij} \quad \text{Equation (16)}$$

Figure 8:
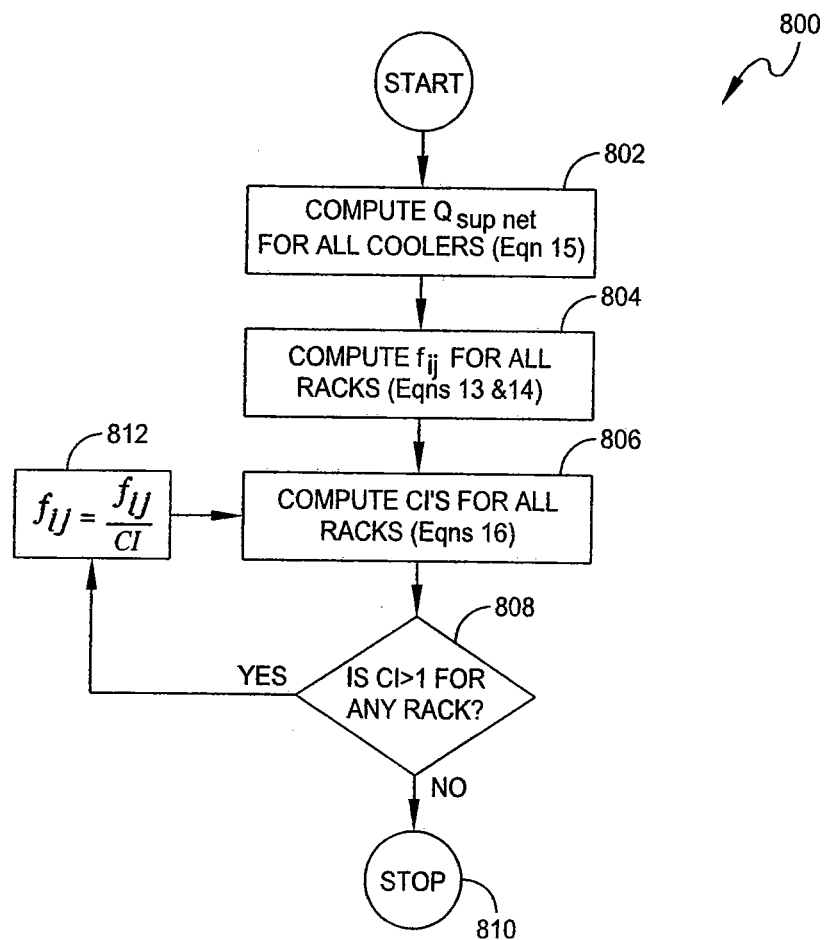
FIG. 8 shows a flowchart of a fifth process in accordance with one embodiment of the invention.

FIG. 8 shows a process 800 for determining CI values using Equation (16). In a first stage 802, the values for $Q_{sup\,net}$ are determined for each of the racks using Equation (15). Next, at stage 804, values for $f_{ij}$ are determined for all racks using Equations (13) and (14). At stage 806, the capture index values for all racks are determined using Equation (16). Next, at stage 808, a determination is made as to whether any of the CI values are greater than 1, which would not represent a valid solution. If the outcome of stage 808 is NO, then the process ends at stage 810. If the outcome of stage 808 is YES, then at stage 812, each $f_{ij}$ value is scaled by the capture index, and stages 806 and 808 are repeated using the new $f_{ij}$ values.

Embodiments described above for determining return temperatures may be used with a number of different cooling calculators. Further, the embodiment for determining airflows discussed above with reference to Equation (12) may be used with coolers other than in-row coolers including overhead or over the aisle coolers and traditional data center perimeter cooling units.

In at least some embodiments above, the ambient air temperature of a data center is used in calculators associated with evaluating cooling performance of a data center. Typically, the ambient air temperature of a data center, absent other data, is assumed to be 68 degrees Fahrenheit—which is also the typical cooler supply temperature. In one embodiment that will now be described, an ambient temperature correction process and tool, which may be utilized in systems and processes described above, adjusts the value for the ambient temperature in a data center until there is a balance between total heat from IT equipment in the data center and total cooling provided by all coolers.

In systems and processes described above, the load on coolers as a result of captured exhaust air from equipment racks is determined Exhaust air that is not captured results in escaped power that heats the room and raises the return temperature of the coolers in the room. The escaped power heats a data center fairly uniformly so that the additional load due to the escaped power is distributed fairly uniformly over all coolers. In one embodiment, the ambient temperature correction process and tool operates in an iterative manner. First, the cooler return temperatures are estimated using an initial assumed ambient temperature (typically 68° F.). Then, the difference between total IT and cooler load in the room is determined using Equation (17):

$$\Delta P_{room} = P_{IT} - P_{coolers} \quad (17)$$

where $P_{IT}$ is the total IT equipment (rack) power and $P_{coolers}$ the total initially-computed load on the coolers.

Figure 9:
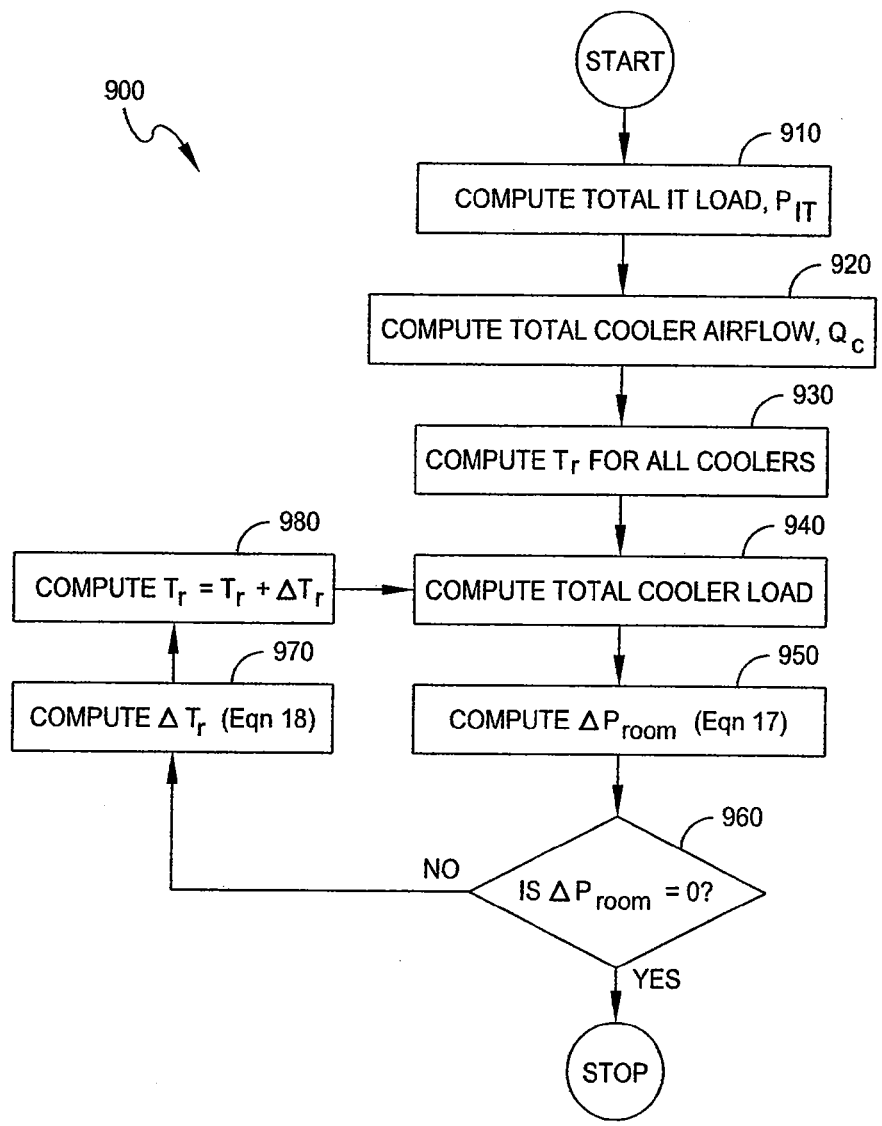
FIG. 9 shows a flowchart of a sixth process in accordance with one embodiment of the invention.

The correction to the ambient ($T_{amb}$) and cooler return ($T_r$) temperatures is then computed using Equation (18):

$$\Delta T_r = \Delta T_{amb} = \frac{\Delta P_{room}}{\rho c_p Q_c} \quad (18)$$

where
$Q_c$=total cooler airflow rate
$\rho$=density of air
$c_p$=specific heat of air at constant pressure A flowchart of a process 900 in accordance with one embodiment for ambient temperature adjustment is shown in FIG. 9. In stage 910 of the process, the total IT load is determined. Next, in stage 920, the total cooler airflow rate is determined, and in stage 930, the return temperature for the coolers is determined using one of the processes discussed above. In stage 940, the total cooler load is determined, using, for example, Equation 1 above. Next, in stage 950, the difference between the total IT and cooler load is determined using Equation (17), and at stage 960, a determination is made as to whether this difference is equal to zero. If the outcome of stage 960 is YES, then the process ends. If the outcome of stage 960 is NO, then the process proceeds to stage 970, where Equation (18) is used to determine the ambient temperature correction factor, and at stage 980, the return temperature is adjusted based on the outcome of stage 970. Stages 940, 950, 960, 970 and 980 are repeated until the outcome of stage 960 is YES, and then the process ends. In addition to ensuring a proper balance of cooling and IT load, process 900 computes the ambient temperature.

While examples with row-based cooling units were discussed above, processes for ambient temperature correction in accordance with embodiments of the invention may be extended to traditional room-based cooling units and other cooling architectures. In one embodiment, in order to estimate the return air temperature of the room coolers, the fraction of IT load that goes directly to the room-based coolers is estimated using equation 19:

$$\Sigma P_{CRACS} = \gamma \Delta P_{room} \quad (19)$$

where,
$\Sigma P_{CRACS}$=the total cooling load on the room-based coolers and $\gamma$ is the fraction of total cooling airflow in the room that comes from room-based coolers which, in the absence of other information, is estimated as follows:

$$\gamma = \frac{\Sigma Q_{CRACS}}{\Sigma Q_{CRACS} + \Sigma Q_{IR}} \quad (20)$$

where,
$\Sigma Q_{CRACS}$=the total cooling airflow of Room coolers
$\Sigma Q_{IR}$=the total cooling airflow of InRow coolers Further, it is assumed that all room-based coolers operate with the same return air temperature. The initial estimate of return air temperature for room-based coolers is calculated from:

$$T_{CRACS} = T_{supply}^c + 3200 \frac{\Sigma P_{CRACS}}{\Sigma Q_{CRACS}} \quad (21)$$

where,
$T_{CRACS}$=the return air temperature of room-based coolers in ° F.
$T_{supply}^c$=the cooler supply air temperature ° F.
$\Sigma P_{CRACS}$=the total cooling load on room-based coolers in kW
and $\Sigma Q_{CRACS}$ is in cfm.

Note that the "3200" includes the density and specific heat of air under standard conditions as well as factors necessary for proper unit conversions. IT load which is not captured by InRow and Room coolers raises the room ambient temperature. This rise in room ambient temperature ($\Delta T_{amb}$) over cooler supply temperature is calculated by satisfying the energy balance in the room:

$$\Delta T_{amb} = 3200 \frac{(1-\gamma)\Delta P}{\Sigma Q_{CRACS} + \Sigma Q_{IR}} \quad (22)$$

where,
$\Delta T_{amb}$ is the rise in room ambient temperature in ° F., $\Delta P$ is in kW, and airflow rates are in cfm.

In the end, the $\Delta T_{amb}$ is added to the originally-estimated room ambient temperature ($T_{amb}$) and cooler return air temperatures and the cooling load on coolers is updated, using Equation 4.

Figure 10:
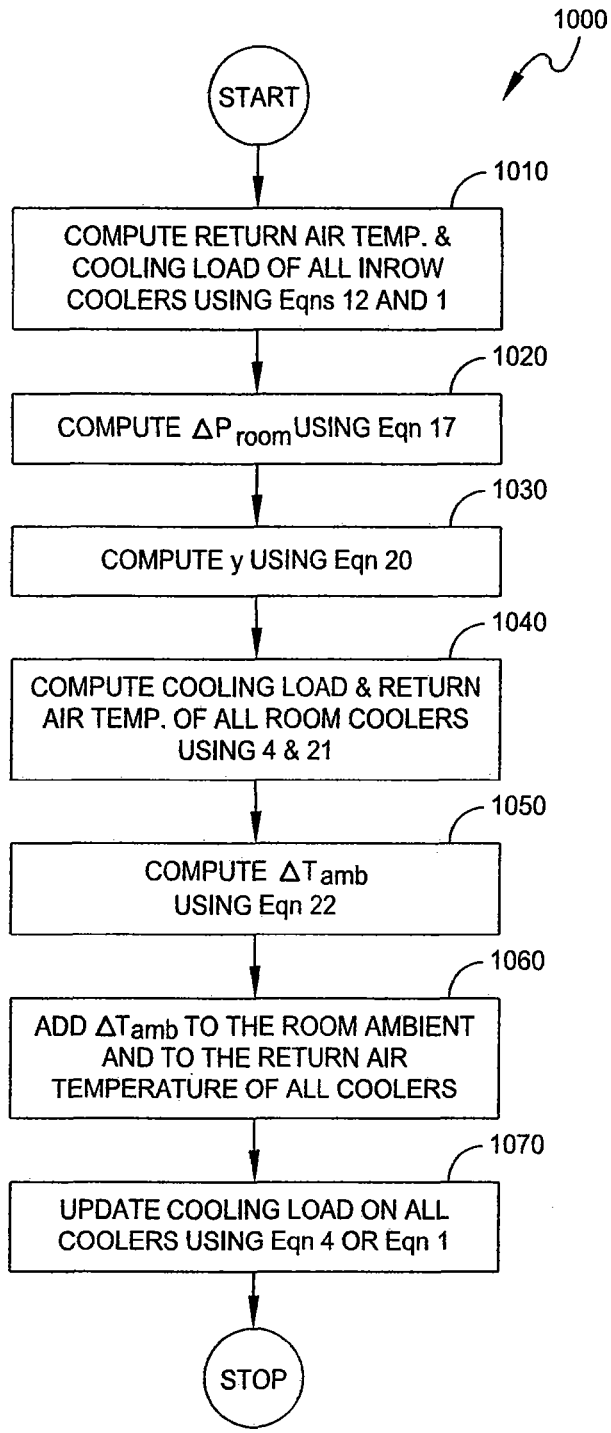
FIG. 10 shows a flowchart of a seventh process in accordance with one embodiment of the invention.

An embodiment of the invention will now be discussed with reference to FIG. 10 which uses a process 1000 for predicting return temperatures and performing the ambient temperature correction when a combination of row and room-based cooling units are present. At stage 1010 of FIG. 10, the return air temperature (Eqn 12) and cooling load (Eqn 1) of all row-based coolers are determined. At stage 1020, the total uncaptured or escaped power is estimated as the difference between the total IT (rack) load and the total cooler load (Eqn 17). At stage 1030, γ is computed (Eqn 20). At stage 1040 the return temperatures and cooling loads of all room-based coolers are calculated based on Equations 21 and 4, respectively. At stage 1050, the ambient temperature correction (which is numerically equal to the cooler return temperature correction) is computed from Equation 22. At stage 1060 the ambient temperature correction is added to the return temperature of all coolers and at stage 1070 the load on each cooler is updated based on Equations 1 or 4.

In determining ambient temperatures in the process above, cooler-return temperatures are first computed assuming that the ambient temperature is equal to the cooler and/or perforated tile supply temperature (e.g. 68° F.). Next, the cooler load is computed and the difference between total room load (heat sources) and cooler load is used to determine the amount of "correction" required. The "correction" is the increase in temperature that is then added to the ambient temperature and the return temperature of all coolers to ensure that a proper overall-room energy balance is achieved. Finally, rack inlet temperatures are then computed based on the assumed cooling-source supply temperature and the "corrected" ambient temperature. This ambient correction method has the advantage of simplicity and calculation efficiency (in some simple cases), although it involves approximations that may at times lead to solutions having less accuracy than may be desired.

In another embodiment, a coupled-solution method is used that may have advantages over the ambient correction method described above. The coupled solution method relies on hot aisle and cold aisle capture indices discussed above and in the '009 application also discussed above. As part of a hot-aisle calculation, hot-aisle CIs (HACIs) are computed from their constituent $f_{ij}$s which are defined as the fraction of airflow from rack i which is captured by cooling source j:

$$HACI_i = \sum_{j=1}^{N} f_{ij} \quad \text{Equation (23)}$$

where N is the number of local cooling sources.

In a similar manner, in cold-aisle-CI calculations, cold-aisle CIs (CACIs) can be computed from their constituent $g_{ij}$s which are defined as the fraction of airflow of rack i which originated from cooling source j:

$$CACI_i = \sum_{j=1}^{N} g_{ij} \quad \text{Equation (24)}$$

In summary, $f_{ij}$ and $g_{ij}$ are the fundamental building blocks of HACI and CACI respectively and they completely characterize the multiple airflow streams which combine to make-up a rack's inlet and exhaust airflow patterns. The coupled solution method of one embodiment uses the $f_{ij}$s and the $g_{ij}$ to determine relevant temperatures in a data center as will now be described.

Figure 11:
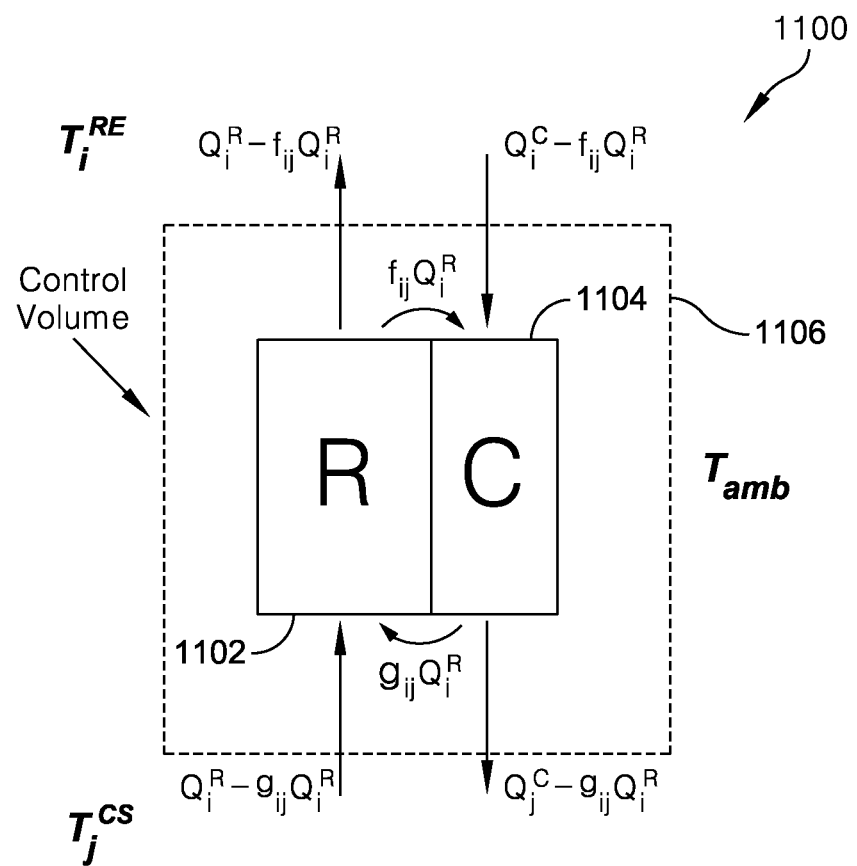
FIG. 11 shows an example of a data center that can be analyzed in accordance with at least one embodiment.

FIG. 11 shows a small data center 1100 populated with one rack 1102 and one cooler 1104 which will be used to describe the coupled solution method. The room is considered to be perfectly sealed such that there is no heat transfer to the external surroundings. The dashed line 1106 represents a control volume around the equipment; rack-cooler airflow interactions take place within the control volume while airflow interactions with the surrounding data center environment occur across the control volume boundaries.

Balancing the energy flow across the control volume boundaries and generalizing to any n racks and N cooling sources leads to Equation 25:

$$\sum_{i=1}^{n}\left(1-\sum_{j=1}^{N}f_{ij}\right)Q_i^R T_i^{RE} + \sum_{j=1}^{N}\left(Q_j^C - \sum_{i=1}^{n}g_{ij}Q_i^R\right)T_j^{CS} = \quad \text{(Equation 25)}$$

$$\sum_{j=1}^{N}\left(Q_j^C - \sum_{i=1}^{n}f_{ij}Q_i^R\right)T_{amb} + \sum_{i=1}^{n}\left(1-\sum_{j=1}^{N}g_{ij}\right)Q_i^R T_{amb}$$

where $Q_i^R$ and $Q_j^C$ are the airflow rates of rack i and cooler j respectively. $T_i^{RE}$, $T_j^{CS}$ and $T_{amb}$ are the exhaust temperature of rack i, the supply temperature of cooler j, and the ambient data center room temperature.

The cooler supply temperature is a function of cooler capacity and its control algorithm; however, it can be written generally as a function of cooler return temperature and cooler airflow rate as shown in Equation 26:

$$T_j^{CS} = T_j^{CS}(T_j^{CR}, Q_j^C) \quad \text{Equation (26)}$$

Cooler return temperature is the result of the mixing of streams which originate at rack exhausts or from the ambient as shown in Equation 27:

$$T_j^{CR} = \frac{\sum_{i=1}^{n}f_{ij}Q_i^R T_i^{RE}}{Q_j^C} + \left(1 - \frac{\sum_{i=1}^{n}f_{ij}Q_i^R}{Q_j^C}\right)T_{amb} \quad \text{Equation (27)}$$

Rack inlet and exhaust temperatures are related by an assumed temperature rise $\Delta T_i^R$ across the rack as shown in Equation (28):

$$T_i^{RE} = T_i^{RI} + \Delta T_i^R \quad \text{Equation (28)}$$

Rack inlet temperature is the result of the mixing of streams which originate at each cooler supply or from the ambient as shown in Equation (29):

$$T_i^{RI} = \sum_{j=1}^{N} g_{ij} T_j^{CS} + \left(1 - \sum_{j=1}^{N} g_{ij}\right)T_{amb} \quad \text{Equation (29)}$$

Equations 25-29 form a coupled set of 2N+2n+1 equations for 2N+2n+1 unknowns which, when solved, provide the inlet and exhaust temperatures of all racks, the return and supply temperatures of all coolers, and the ambient temperature.

Figure 12:
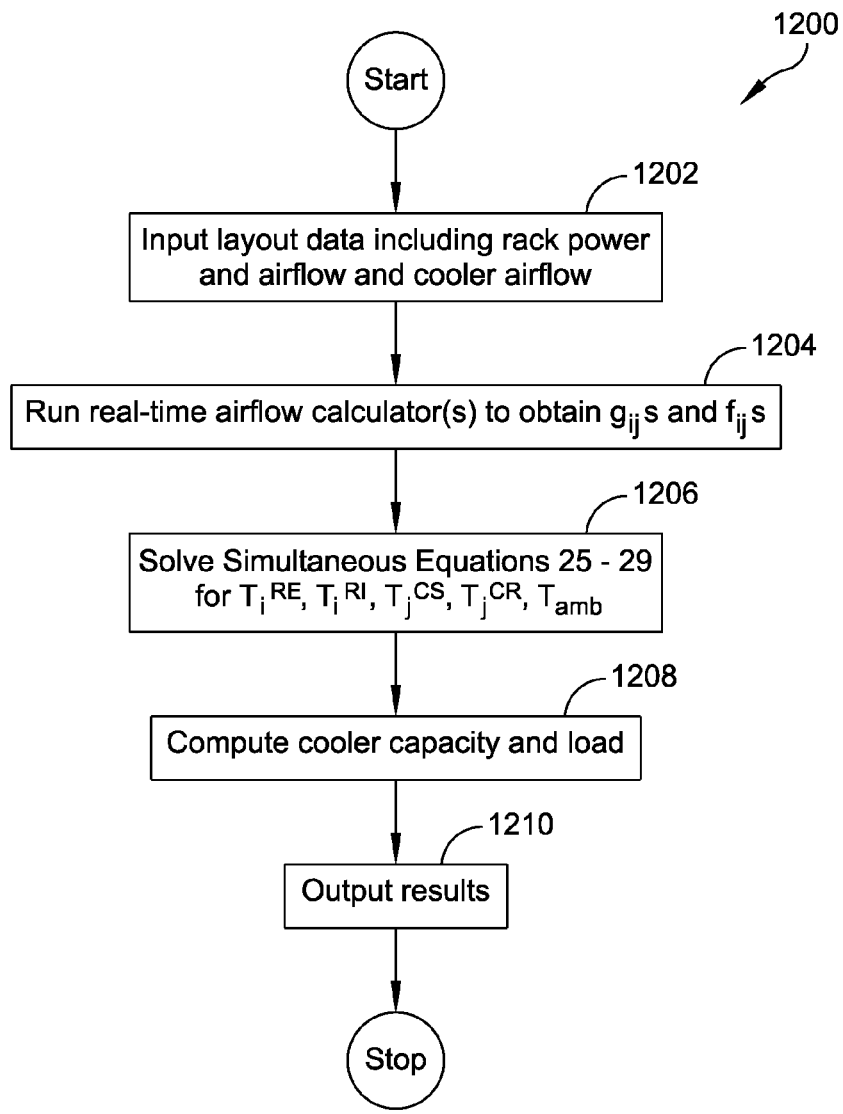
FIG. 12 is a flowchart of a process in accordance with one embodiment.

The general process 1200 for predicting data center airflows and temperatures is shown in FIG. 12. First at act 1202, input data is entered either automatically or manually into the data center design or management software. Next at act 1204, airflow patterns associated with racks and coolers are determined using any of a number of real-time tools discussed above and in documents referenced above. Multiple algorithms may be called for a complete data center analysis (e.g. different algorithms for hot and cold aisle two-row clusters, single-row clusters, containment clusters, etc.) Next at act 1206, Equations 25-29 are solved for all unknown rack, cooler, and ambient temperatures. If desired, at act 1208, the maximum cooler capacity and load at the predicted conditions may be computed for each cooler and provided to the user at act 1210 along with all computed temperatures. The output temperatures and cooler capacities and loads may be displayed on a user display as described above.

In embodiments of the invention, Equations 25-29 are linear except Equation 26 which depends on the cooler characteristics. In most practical cases, Equation 26 is piecewise linear in that, below some threshold return temperature, the cooler is able to supply air at a fixed set point-temperature. Above the threshold, the supply temperature tends to rise linearly with return temperature. This prevents a direct simultaneous solution to Equations 25-29 with a linear solver; however, for at least some embodiments, it is sufficient to assume that the cooler supply temperature is equal to the known supply temperature and then simply check to see if the capacity has been exceeded based on the resulting temperatures. If the capacity has been exceeded a warning may be presented to the user and changes may be made to the layout until there are no more cooling warnings.

Figure 13:
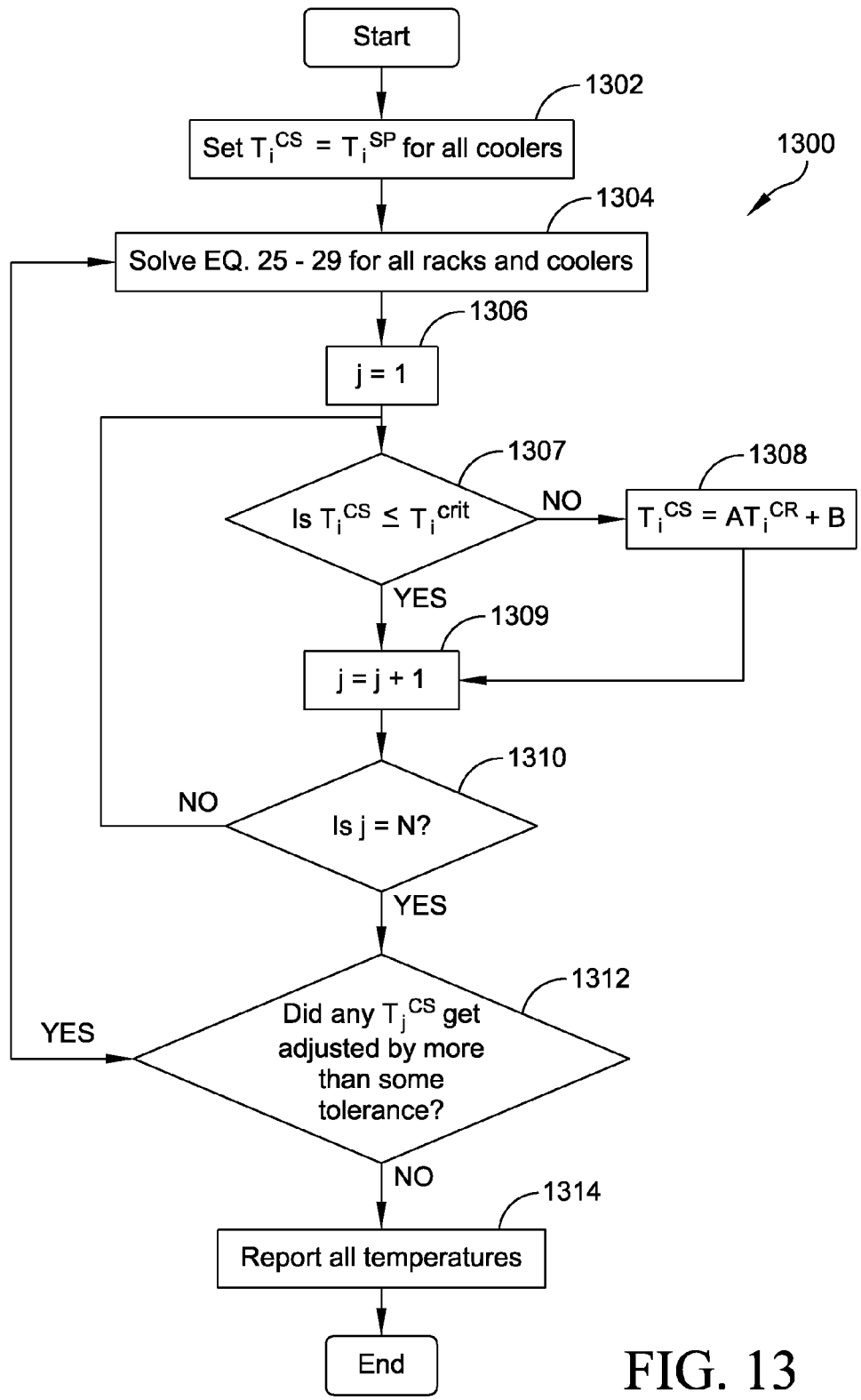
FIG. 13 is a flowchart of a process in accordance with one embodiment.
Figure 14:
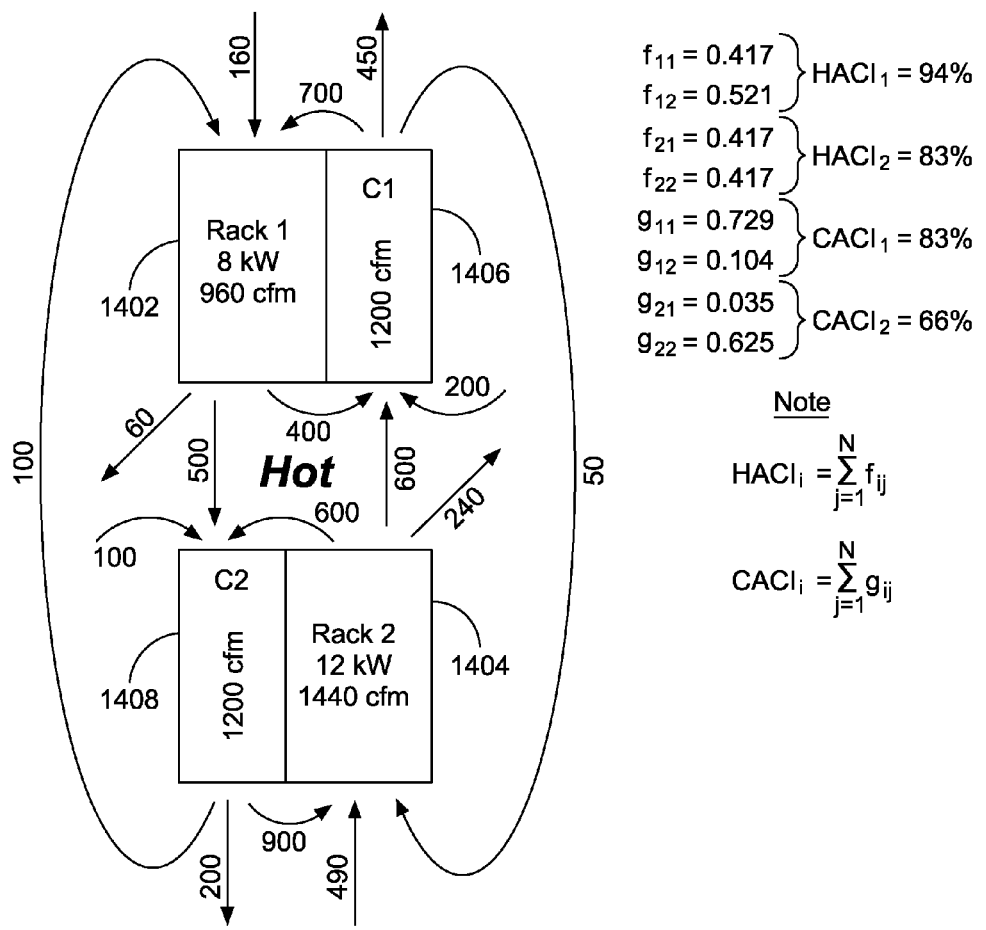
FIG. 14 is a diagram showing an example of a data center used in accordance with at least one example.

An alternative process 1300 for handling the non-linear cooler equation used in at least one embodiment will now be described with reference to FIG. 13. All temperatures are initially computed assuming that all coolers supply airflow at their set point temperature, and in the first act 1302 of process 1300, the supply temperature for each cooler is set equal to its set-point temperature. At act 1304 of process 1300, equations 25-29 are solved for each cooler, and then in acts 1306 through 1310, for each cooler j for a total of N coolers, a check is made as to whether the computed return temperature is above or below the threshold temperature (above which the cooler can no longer maintain the set point supply temperature). The values of A and B in act 1308 depend on the type of cooler and, in the case of chilled-water coolers, the Entering Water Temperature (EWT) and $\Delta T$ of the facility chilled water system. In any event, values of A and B may be readily determined from published manufacturer data such as APC's "InRow RC Technical Data Manual". If all return temperatures are below the threshold temperature, the assumed cooler set-point supply temperature is correct and no iteration is required. If, instead, one or more coolers' threshold return temperatures have been exceeded, the supply temperatures are updated at act 1308 based on Equation 26. At act 1312, a determination is made as to whether any of the cooler supply temperatures were adjusted in acts 1306 through 1310 by more than a predetermined threshold, and if the outcome of act 1312 is yes, then the entire set of Equations 25-29 is re-solved. This process continues until the supply temperatures of all coolers no longer changes from iteration to iteration by more than the set tolerance, and then all of the temperatures are reported at act 1314. In one embodiment, the threshold used in act 1312 is 0.5° F. In other embodiments the threshold is some small fraction of the difference between maximum and minimum temperatures anywhere in the data center. In yet another embodiment, a fixed number of iterations can be executed. Although the cooler supply temperature is assumed to be a piecewise linear function of return temperature in the process of FIG. 12, this technique is not restricted to such relationships and works the same way without further modification An example using the process of FIG. 12 will now be described using the equipment layout 1400 shown in FIG. 14. The layout 1400 includes two racks 1402 and 1404 (also identified in FIG. 14 as Rack 1 and Rack 2), and two coolers 1406 and 1408 (also identified in FIG. 14 as Cooler 1 and Cooler 2). The air flows for each of the coolers and racks are known and are identified in FIG. 14, and result in the $f_{ij}$ and $g_{ij}$ values listed. Also the calculated Hot Aisle Capture Index (HACI) for each cooler and Cold Aisle Capture Index (CACI) for each rack are also shown in FIG. 14. The cooler supply temperatures are known and equal to 68° F. Also, from the indicated rack power and airflow rates, it is known that the temperature rise across each rack is 26.5° F. Equations 25-29 can be used to determine relevant temperatures for the layout 1400.

Substituting the values from the example of FIG. 14 into Equation 25 results in one equation with three unknown values. Equation 26 is not used in the present example as the supply cooler temperatures are known. The application of Equation 27 to the example of FIG. 14 results in two equations for the return temperatures of each cooler. The application of Equation 28 results in two equations for the exhaust temperatures of the racks, and the application of Equation 29 results in two equations for the inlet temperatures of each of the racks.

The application of Equations 25-29 to the example of FIG. 14 results in a coupled set of seven linear equations for the seven unknowns $T_1^{RE}$, $T_2^{RE}$, $T_{amb}$, $T_1^{RI}$, $T_2^{RI}$, $T_1^{CR}$, and $T_2^{CR}$. Although any of a variety of techniques can be used to solve the equations, in one embodiment, a linear Gaussian matrix solver is used resulting in the following temperature values:

$T_1^{RE}$=96.26° F.
$T_2^{RE}$=97.72° F.
$T_{amb}$=77.43° F.
$T_1^{RI}$=69.76° F.
$T_2^{RI}$=71.22° F.
$T_1^{CR}$=93.87° F.
$T_2^{CR}$=95.41° F.

In one embodiment, a number of checks may be performed to verify the solution. First, the system can verify that that total cooler load balances the total rack power as it must in a sealed environment. Second, the system can verify that the temperature rise across each rack agrees with the initial assumption of 26.5° F. (consistent with the defined airflow rate and power dissipation of each rack) by subtracting the rack inlet temperature from the rack outlet temperature for each rack. For most practical cases, the application of Equations 25-29 leads to a set of coupled linear equations which can be solved directly (without iteration) to obtain all rack and cooler inlet and outlet temperatures as well as the room ambient temperature. The equations are rigorously conservative; conservation of energy (a balance between rack power and cooler load) is assured.

As discussed above, in the coupled solution method, Equation 26 is a piecewise-linear equation having two portions, the constant desired supply temperature portion and the linearly increasing supply temperature portion when the critical return temperature is surpassed. The coupled method is first performed with all supply temperatures constant, and then if any critical temperature is violated, the linear piece is substituted for the constant supply temperature, and the system is then resolved using the iterative process 1300 described above. The coupled process provides an exact solution, but the iterative process can result in a lack of speed that may be less than desirable for large systems.

Figure 15:
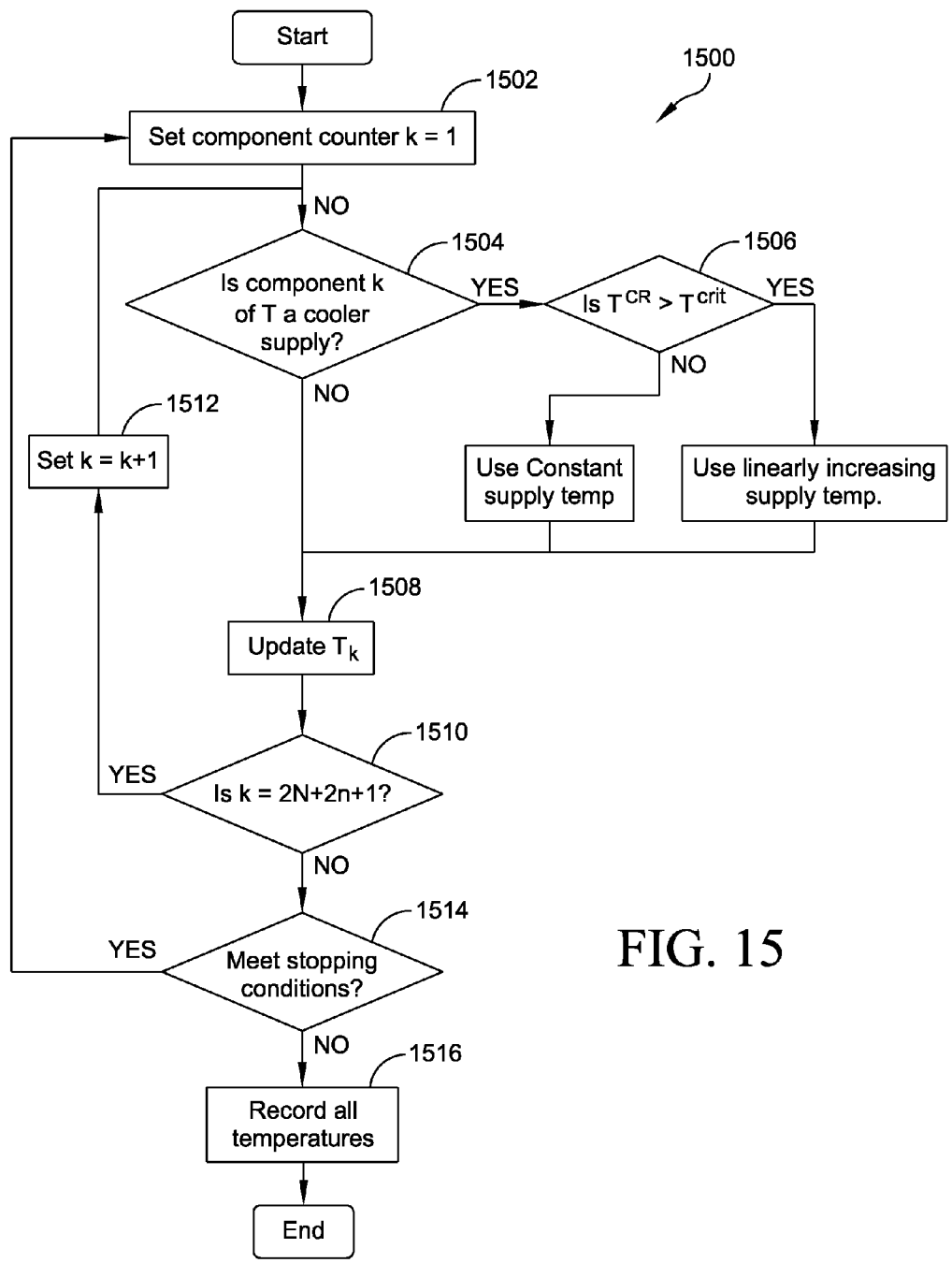
FIG. 15 is a flowchart of a process in accordance with one embodiment.

In another embodiment, a method similar to the known Gauss-Seidel algorithm for solving systems of linear equations is used to solve equations 25-29 to determine temperatures in a data center. In this embodiment, the Gauss-Seidel algorithm is extended to work with the piecewise-linear system by substituting the linear portions of the supply temperature equation for the constant supply temperature as soon as critical temperatures are reached. The process 1500 used in this embodiment is discussed below with reference to FIG. 15 followed by a description of specific implementation features directed to initial conditions, stopping conditions, and adjustments for quicker runtimes.

Prior to the start of the process 1500, the Equations (25)-(29) are stored in matrix-vector form AT=b with the components of T defined by Equation 30

$$T_k = \begin{cases} T_k^{RI}, & \text{if } k = 1, \ldots, n \\ T_{k-n}^{RE}, & \text{if } k = n+1, \ldots, 2n \\ T_{amb}, & \text{if } k = 2n+1 \\ T_{k-(2n+1)}^{CR}, & \text{if } k = 2n+2, \ldots, 2n+N+1 \\ T_{k-(2n+N+1)}^{CS}, & \text{if } l = 2n+N+2, \ldots, 2n+2N+1 \end{cases} \quad \text{Equation (30)}$$

As with above, N is the number of coolers in the data center being analyzed and n is the number of equipment racks. Additional rows of A and b are constructed for the second linear piece of Equation (26) and are denoted by a' and b'. As discussed above and shown in Equation (26) above, the cooler supply temperature is a function of cooler return temperature and cooler airflow rate. In this embodiment, the cooler supply temperature is modeled as a piecewise linear equation of return temperature for any fixed cooler airflow rate ($Q_j^C$). For a given desired supply temperature $T^{Supply}$, $T_j^{crit}$ and $T_j^{CS}$ are defined by Equations (31) and (32) below $$T_j^{crit} = \frac{T_j^{Supply} - \left(\frac{B_0}{\rho c_p (Q_j^C)^{0.2} (Q_0)^{0.8}}\right)}{\left(1 - \frac{A_0}{\rho c_p (Q_j^C)^{0.2} (Q_0)^{0.8}}\right)} \quad \text{Equation (31)}$$

$$T_j^{CS} = \begin{cases} T^{Supply}, & \text{if } T_j^{CR} < T_j^{crit} \\ \left(1 - \frac{A_0}{\rho c_p (Q_j^C)^{0.2} (Q_0)^{0.8}}\right) T_j^{CR} - \\ \left(\frac{B_0}{\rho c_p (Q_j^C)^{0.2} (Q_0)^{0.8}}\right), & \text{otherwise} \end{cases} \quad \text{Equation (32)}$$

Where the values of the constants $A_0$, $B_0$, and $Q_0$, are dependent on the type of cooler and may be readily determined from published material such as APC's "InRow RC Technical Data Manual". The values for density ρ, and specific heat $c_p$ of air may be taken at standard conditions. Note that the 0.2 and 0.8 exponents arise from the assumption that the cooler capacity reduces with the airflow rate to the 0.8 power, $P^{cap}/P_0^{cap} = (Q/Q_0)^{0.8}$, where P is cooler capacity and the "0" subscript corresponds to the maximum-airflow operating point. Before the start of the process 1500 of FIG. 15, initial temperatures are set for each of the temperature values to be determined A process in accordance with one embodiment for setting initial temperature values is discussed below. In the first act 1502 of the process 1500, the value of a counter k corresponding to temperature components is set to 1. In the next act 1504, a determination is made as to whether the unkown temperatures corresponding to the current value of k is a cooler supply. If the outcome of act 1504 is yes, then at act 1506, a determination is made as to whether the return temperature for the cooler is greater than the critical temperature for that cooler. If the return temperature of the cooler is greater than the critical temperature, then the linear-function-of-return-temperature portion of Equation 32 is used for Equation 26, otherwise, the constant supply temperature of Equation 32 is used for Equation 26. If the outcome of act 1504 is no, then the process proceeds directly to act 1508.

Next, at act 1508, Equation 33 is used to update the values of all of the temperatures ($T_k$), $$T_k = T_k + \sum_{j=1}^{2N+2n+1} a_{kj} T_j - b_k \quad \text{Equation (33)}$$

At act 1510, a determination is made as to whether k<2N+2n+1. If the outcome of act 1510 is NO, then the value of k is increased by 1 at act 1512, and acts 1504 to 1510 are repeated until the outcome of act 1510 is YES.

Next, at act 1514, a determination is made as to whether stopping conditions for the process have been met. In different embodiments, different criteria for stopping conditions may be used as discussed below. If the stopping conditions are not met, then acts 1502 to 1514 are repeated until the outcome of act 1514 is YES, after which, at act 1516 the temperatures may be recorded and saved in the system, displayed to a user, and or be used in further analysis of the data center.

In the iterative process 1500 discussed above, efficiency of the process depends slightly on the quality of the initial starting point. In one embodiment, having a known desired cooler supply temperature $T^{Supply}$, the initial temperatures $T^{Init}$ are determined as shown below in Equation (34)

$$T_k^{Init} = \begin{cases} \overline{T}^{Supply}, & \text{if } k = 1, \ldots, n \\ \overline{T}^{Supply} + \Delta T_{k-n}, & \text{if } k = n+1, \ldots, 2n \\ \overline{T}^{Supply}, & \text{if } k = 2n+1 \\ \overline{T}^{Supply} + \Delta \overline{T}, & \text{if } k = 2n+2, \ldots, 2n+N+1 \\ \overline{T}^{Supply}, & \text{if } k = 2n+N+1, \ldots, 2n+2N+1 \end{cases} \quad \text{Equation (34)}$$

In Equation (34), ΔT is the average ΔT across the racks which depends on the type of IT equipment and is typically in the range of 20-30° F.

In act 1514 of process 1500, a determination is made as to whether stopping conditions have been met. In different embodiments that use process 1500, there are different stopping conditions that may be used. In one embodiment, an iteration counter having a fixed limit may be used to limit the number of times that the process is conducted before it is completed. In one version, the limit is between 50 and 100, but other values may be used. In other embodiments, the process is continued until all temperatures no longer change by more than some small tolerance each iteration. If the solution fails to converge, a warning message may be presented to the user.

In a second embodiment, a tolerance level on the overall energy balance of the room may be used to establish stopping conditions of process 1500. If the absolute value of (total cooler load—total rack load) falls below a given threshold or if the relative difference falls below a given threshold, then the stopping conditions are met. This embodiment for stopping conditions may be combined with the fixed number of iteration embodiment, such that the process 1500 will stop at the earlier of the fixed number of iterations being met, or the tolerance level being met.

In embodiments that use the iterative process 1500, for some applications, convergence of the process may be slowed by the use of small initial steps which are defined by the portion of Equation (33) shown by Equation (34) below:

$$\sum_{j=1}^{2N+2n+1} a_{kj}T_j - b_k. \qquad \text{Equation (35)}$$

In one embodiment, an over-relaxation is used to increase the size of the steps. In this process, Equation (35) is multiplied by a scalar >1, forcing the algorithm to take large initial steps to achieve quicker convergence. Modified Equation (35) using the scalar is shown in Equation (36) below:

$$\omega\left(\sum_{j=1}^{2N+2n+1} a_{kj}T_j - b_k\right) \qquad \text{Equation (36)}$$

In Equation (36) ω is set to be greater than 1, and in one embodiment, ω=1.05. If the value of the scalar is set too high, then for some applications, the use of the scalar may actually slow convergence.

In the iterative method 1500 described above, the step is calculated by computing the sum of the product of all temperatures and all entries in row i of the matrix A. This can be inefficient, since for most applications there are only a few nonzero entries in each row. For Equations (25)-(29), each equation's structure requires at most N+1, n+1, n+N+1, or just 2 multiplications. Therefore, in one embodiment, updating temperature by the minimum (nonzero) entries required by Equations (25)-(29) provides a more efficient implementation.

In embodiments above, processes and systems are provided that can determine relevant temperatures in a data center, and determine maximum cooler and rack capacities. The systems and methods can be used to provide optimized design of a data center by using results of the systems and methods to change the actual layout of equipment or the proposed layout of equipment.

In processes described above, values related to data center cooling, including air flows and temperatures are determined. As readily understood by one of ordinary skill in the art, in at least some embodiments, the values determined are predictions for actual values that will occur in a data center having the parameters modeled.

In methods of at least one embodiment of the invention, after successful modeling of a cluster in a data center, the results of the model may be used as part of a system to order equipment, ship equipment and install equipment in a data center as per the designed layout.

In at least some embodiments of the invention discussed herein, the performance of assessments and calculations in real-time refers to processes that are completed in a matter of a few seconds or less rather than several minutes or longer as can happen with complex calculations, such as those involving typical CFD calculations.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for evaluating cooling performance of equipment in a data center, the equipment including a plurality of equipment racks and at least one cooling provider, the method comprising:
   receiving data regarding each equipment rack of the plurality of equipment racks and the at least one cooling provider, the data including a layout of the plurality of equipment racks and the at least one cooling provider, and a power draw value for each equipment rack;
   storing the received data;
   computing, by a computer system, a fraction of total airflow originating from the at least one cooling provider that is captured by each equipment rack and a fraction of total airflow from each equipment rack that is captured by the at least one cooling provider;
   computing, by the computer system, an ambient air temperature in the data center based on airflows in the data center;
   computing, by the computer system, an inlet air temperature and an exit air temperature for the at least one cooling provider based on the ambient air temperature, the layout, the power draw value and the fraction of total airflow from each equipment rack that is captured by the at least one cooling provider;
   for each equipment rack, computing an inlet air temperature and an exit air temperature, by the computer system, based on the ambient air temperature, the layout, the power draw value and the fraction of total airflow originating from the at least one cooling provider that is captured by each equipment rack; and
   displaying an indication of the inlet air temperature and the exit air temperature for each equipment rack and the at least one cooling provider;
   wherein computing the inlet air temperature and the exit air temperature of each equipment rack and the at least one cooling provider includes establishing a set of S coupled equations, with S equal to a number of temperature values to be computed, and solving the S coupled equations; and
   wherein the displayed inlet air temperature and the exit air temperatures are further used to determine at least one configuration of the equipment racks and the at least one cooling provider.

2. The computer implemented method of claim 1, wherein the at least one cooling provider includes a plurality of cooling providers, and the method further includes computing a maximum cooler capacity value for each cooling provider of the plurality of cooling providers based on a maximum inlet air temperature to the plurality of cooling providers.

3. The computer implemented method of claim 2, further comprising computing a maximum rack capacity for each equipment rack based on available space in each equipment rack, based on power available to each equipment rack, and based on the maximum cooler capacity of at least one of the plurality of cooling providers.

4. The computer implemented method of claim 1, where N is equal to a number of cooling providers in the data center, n is equal to a number of the plurality of equipment racks, and wherein S is equal to two times N plus two times n plus one.

5. The computer implemented method of claim 4, wherein solving the S coupled equations includes solving at least one piece-wise linear equation of the S coupled equations by identifying a breakpoint in the piece-wise linear equation and using a different linear equation before and after the breakpoint.

6. The computer implemented method of claim 5, wherein solving the S coupled equations includes using an iterative process to repeatedly solve the S coupled equations to reach a final value for the inlet air temperature and the exit air temperature of each equipment rack and the at least one cooling provider.

7. The computer implemented method of claim 1, wherein displaying an indication of the inlet air temperature and the exit air temperature for each equipment rack and the at least one cooling provider includes displaying a model of the data center with the indication displayed on the model.

8. The computer-implemented method of claim 1, wherein solving the set of S coupled equations includes setting the inlet air temperature of the at least one cooling provider equal to a set-point supply temperature of the at least one cooling provider.

9. A system for evaluating equipment in a data center, the equipment including a plurality of equipment racks and at least one cooling provider, the system comprising:
an interface; and
a controller coupled to the interface and configured to:
receive data regarding each equipment rack of the plurality of equipment racks and the at least one cooling provider, the data including a layout of the plurality of equipment racks and the at least one cooling provider, and a power draw value for each equipment rack;
store the received data in a storage device associated with the system;
compute a fraction of total airflow originating from the at least one cooling provider that is captured by each equipment rack and a fraction of total airflow from each equipment rack that is captured by the at least one cooling provider;
compute an ambient air temperature in the data center based on airflows in the data center;
compute an inlet air temperature and an exit air temperature for the at least one cooling provider and for each equipment rack of the plurality of equipment racks based on the ambient air temperature, the layout, the power draw value, and the fraction of total airflow originating from the at least one cooling provider that is captured by each equipment rack and the fraction of total airflow from each equipment rack that is captured by the at least one cooling provider by establishing a set of S coupled equations, with S equal to a number of temperature values to be computed, and solving the S coupled equations.

10. The system of claim 9, wherein the at least one cooling provider includes a plurality of cooling providers, and the controller is further configured to compute a maximum cooler capacity value for each cooling provider of the plurality of cooling providers based on a maximum inlet air temperature to the plurality of cooling providers.

11. A system for evaluating equipment in a data center, the equipment including a plurality of equipment racks and at least one cooling provider, the system comprising:
an interface; and
a controller coupled to the interface and configured to:
receive data regarding each equipment rack of the plurality of equipment racks and the at least one cooling provider, the data including a layout of the plurality of equipment racks and the at least one cooling provider, and a power draw value for each equipment rack;
store the received data in a storage device associated with the system; compute a fraction of total airflow originating from the at least one cooling provider that is captured by each equipment rack and a fraction of total airflow from each equipment rack that is captured by the at least one cooling provider;
compute an ambient air temperature in the data center based on airflows in the data center;
compute an inlet air temperature and an exit air temperature for the at least one cooling provider and for each equipment rack of the plurality of equipment racks based on the ambient air temperature, the layout, the power draw value, and the fraction of total airflow originating from the at least one cooling provider that is captured by each equipment rack and the fraction of total airflow from each equipment rack that is captured by the at least one cooling provider by establishing a set of S coupled equations, with S equal to a number of temperature values to be computed, and solving the S coupled equations; and
wherein the computed inlet air temperature and the exit air temperatures are further used to determine at least one configuration of the equipment racks and the at least one cooling provider.

12. The system of claim 9, where N is equal to a number of cooling providers in the data center, n is equal to a number of the plurality of equipment racks, and wherein S is equal to two times N plus two times n plus one.

13. The system of claim 12, wherein solving the S coupled equations includes solving at least one piece-wise linear equation of the S coupled equations by identifying a breakpoint in the piece-wise linear equation and using a different linear equation before and after the breakpoint.

14. The system of claim 13, wherein solving the S coupled equations includes using an iterative process to repeatedly solve the S coupled equations to reach a final value for the inlet air temperature and the exit air temperature of each equipment rack and the at least one cooling provider.

15. A non-transitory computer readable medium having stored thereon sequences of instruction for evaluating equipment in a data center, the equipment including a plurality of equipment racks and at least one cooling provider, the sequences of instruction including instructions that will cause at least one processor to:
receive data regarding each equipment rack of the plurality of equipment racks and the at least one cooling provider, the data including a layout of the plurality of equipment racks and the at least one cooling provider, and a power draw value for each equipment rack;
store the received data in a storage device associated with the at least one processor; compute a fraction of total airflow originating from the at least one cooling provider that is captured by each equipment rack and a fraction of total airflow from each equipment rack that is captured by the at least one cooling provider;
compute an ambient air temperature based on airflows in the data center; and
compute an inlet air temperature and an exit air temperature for the at least one cooling provider and for each equipment rack based on the ambient air temperature, the layout, the power draw value, and the fraction of total airflow originating from the at least one cooling provider that is captured by each equipment rack and the fraction of total airflow from each equipment rack that is captured by the at least one cooling provider by establishing a set of S coupled equations, with S equal to a number of temperature values to be computed, and solving the S coupled equations; and wherein the computed inlet air temperature and the exit air temperatures are further used to determine at least one configuration of the equipment racks and the at least one cooling provider.

16. The non-transitory computer readable medium of claim 15, wherein the at least one cooling provider includes a plurality of cooling providers, and the sequences of instructions include instructions that will cause the at least one processor to compute a maximum cooler capacity value for each of the plurality of cooling providers based on a maximum inlet air temperature to the plurality of cooling providers.

17. The non-transitory computer readable medium of claim 15, where N is equal to a number of cooling providers in the data center, n is equal to a number of the plurality of equipment racks, and wherein S is equal to two times N plus two times n plus one.

18. The non-transitory computer readable medium of claim 17, wherein solving the S coupled equations includes solving at least one piece-wise linear equation of the S coupled equations by identifying a breakpoint in the piece-wise linear equation and using a different linear equation before and after the breakpoint.

* * * * *

UNITED STATES PATENT AND TRADEMARK OFFICE
CERTIFICATE OF CORRECTION

PATENT NO. : 8,972,217 B2  
APPLICATION NO. : 12/795862  
DATED : March 3, 2015  
INVENTOR(S) : James W. VanGilder et al.

Page 1 of 1

It is certified that error appears in the above-identified patent and that said Letters Patent is hereby corrected as shown below:

In the Claims

Column 31, claim 9, line 51, after "coupled equations" insert

--; and wherein the computed inlet air temperature and the exit air temperatures are further used to determine at least one configuration of the equipment racks and the at least one cooling provider.--;

Column 31, claim 11, line 58, replace claim 11 with

--The system of claim 10, wherein the controller is further configured to compute a maximum rack capacity for each equipment rack based on available space in each equipment rack, based on power available to each equipment rack, and based on the maximum cooler capacity of at least one of the plurality of cooling providers.--.

Signed and Sealed this  
Ninth Day of June, 2015

Michelle K. Lee  
*Director of the United States Patent and Trademark Office*